(12) United States Patent
Kim et al.

(10) Patent No.: US 12,317,176 B2
(45) Date of Patent: May 27, 2025

(54) METHOD BY A USER EQUIPMENT INCLUDES PERFORMING PHYSICAL DOWNLINK CONTROL CHANNEL (PDCCH) MONITORING BASED ON A SEARCH SPACE SET SATISFYING A PREDETERMINED CONDITION

(71) Applicant: LG ELECTRONICS INC., Seoul (KR)

(72) Inventors: Seonwook Kim, Seoul (KR); Inkwon Seo, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 475 days.

(21) Appl. No.: 17/755,396

(22) PCT Filed: Oct. 29, 2020

(86) PCT No.: PCT/KR2020/014964
§ 371 (c)(1),
(2) Date: Apr. 28, 2022

(87) PCT Pub. No.: WO2021/086084
PCT Pub. Date: May 6, 2021

(65) Prior Publication Data
US 2023/0054007 A1    Feb. 23, 2023

(30) Foreign Application Priority Data

Oct. 29, 2019 (KR) .................. 10-2019-0135790
Nov. 6, 2019 (KR) .................. 10-2019-0141225

(Continued)

(51) Int. Cl.
*H04W 48/16* (2009.01)
*H04W 24/08* (2009.01)
*H04W 72/121* (2023.01)

(52) U.S. Cl.
CPC .......... *H04W 48/16* (2013.01); *H04W 24/08* (2013.01); *H04W 72/121* (2013.01)

(58) Field of Classification Search
None
See application file for complete search history.

(56) References Cited

U.S. PATENT DOCUMENTS

2020/0351682 A1* 11/2020 Cirik .................. H04W 76/28
2020/0389874 A1* 12/2020 Lin ..................... H04W 72/23
(Continued)

FOREIGN PATENT DOCUMENTS

WO    2018-144899    8/2018

OTHER PUBLICATIONS

PCT International Application No. PCT/KR2020/014964, International Search Report dated Feb. 22, 2021, 3 pages.

(Continued)

*Primary Examiner* — Saad Khawar
(74) *Attorney, Agent, or Firm* — LEE, HONG, DEGERMAN, KANG & WAIMEY

(57) ABSTRACT

The present disclosure relates to a wireless communication system and, specifically, to a method and a device therefor, the method comprising the steps of: obtaining information on a plurality of search space sets and a plurality of groups including parts of the plurality of search space sets; obtaining information on one group for monitoring a PDCCH from among the plurality of groups; and monitoring the PDCCH on the basis of search space sets which satisfy a pre-defined condition from among search space sets corresponding to the one group, wherein the pre-defined condition includes a (Continued)

condition where the number of PDCCH candidates and the number of non-overlapping control channel elements (CCEs) are less than or equal to specific values.

15 Claims, 14 Drawing Sheets

(30) Foreign Application Priority Data

Nov. 29, 2019 (KR) ........................ 10-2019-0156470
Oct. 15, 2020 (KR) ........................ 10-2020-0133305

(56) References Cited

U.S. PATENT DOCUMENTS

2021/0022122 A1* 1/2021 Khoshnevisan ...... H04W 72/23
2021/0352501 A1* 11/2021 Taherzadeh Boroujeni ................
H04W 72/23

OTHER PUBLICATIONS

LG Electronics, "Physical layer design of DL signals and channels for NR-U," R1-1904620, 3GPP TSG RAN WG1 #96bis, Apr. 2019, 10 pages.
3rd Generation Partnership Project, "Technical Specification Group Radio Access Network; NR; Physical layer procedures for control (Release 15)," 3GPP TS 38.213 V15.7.0, Sep. 2019, 110 pages.
LG Electronics, "Physical layer design of DL signals and channels for NR-U," R1-1910817, 3GPP TSG RAN WG1 #96bis, Oct. 2019, 18 pages.
LG Electronics, "Discussion on PDCCH-based power saving signal/channel," R1-1906695, 3GPP TSG RAN WG1 Meeting #97, May 2019, 8 pages.

* cited by examiner

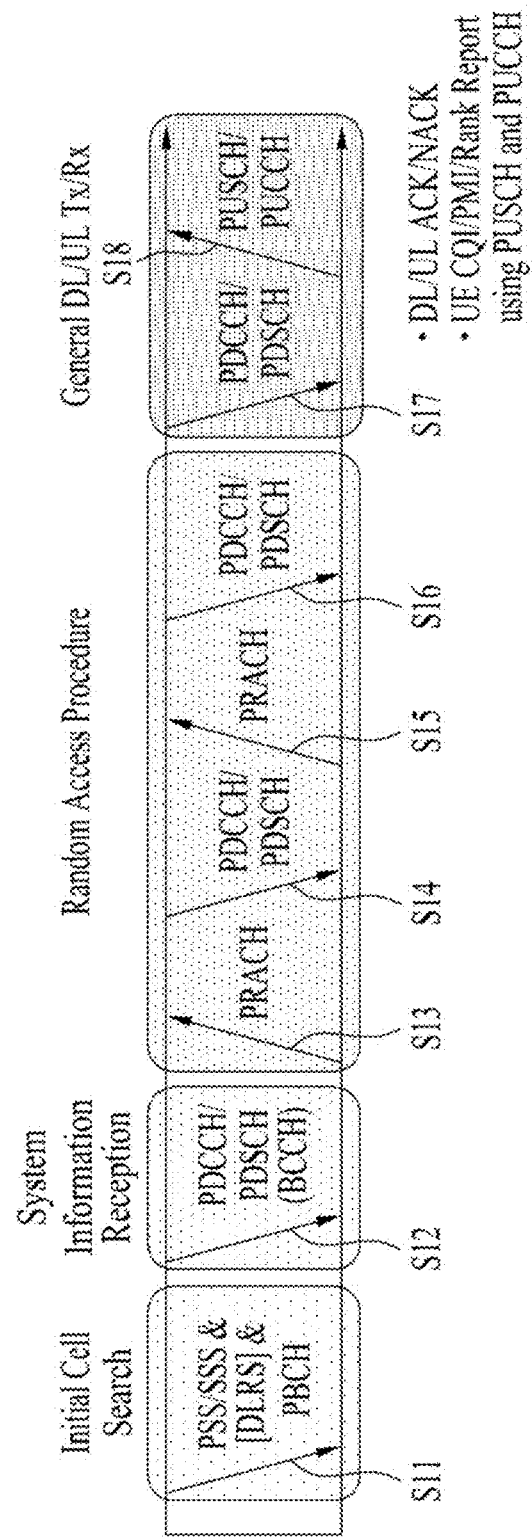

[Figure 2]
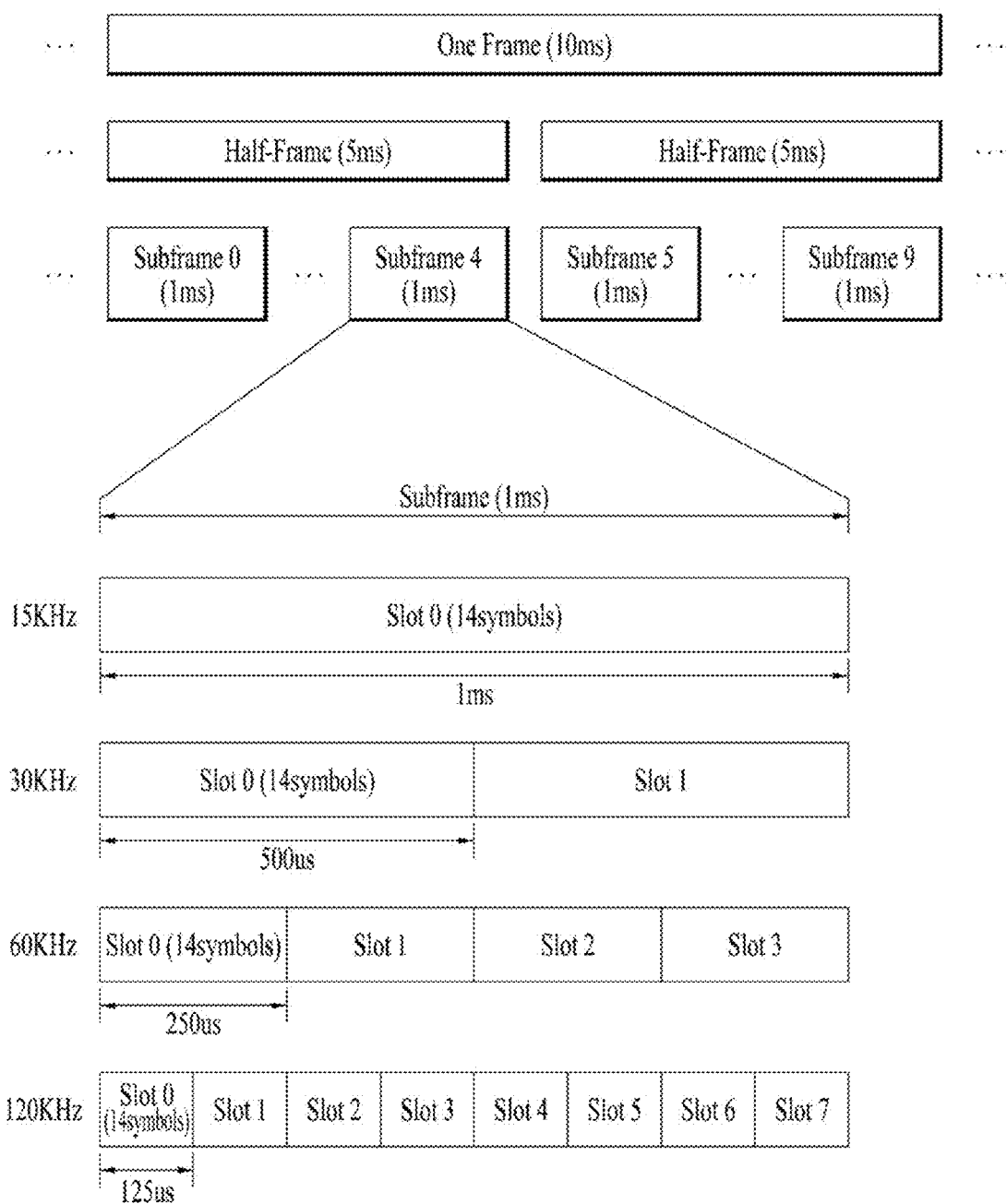

[Figure 3]
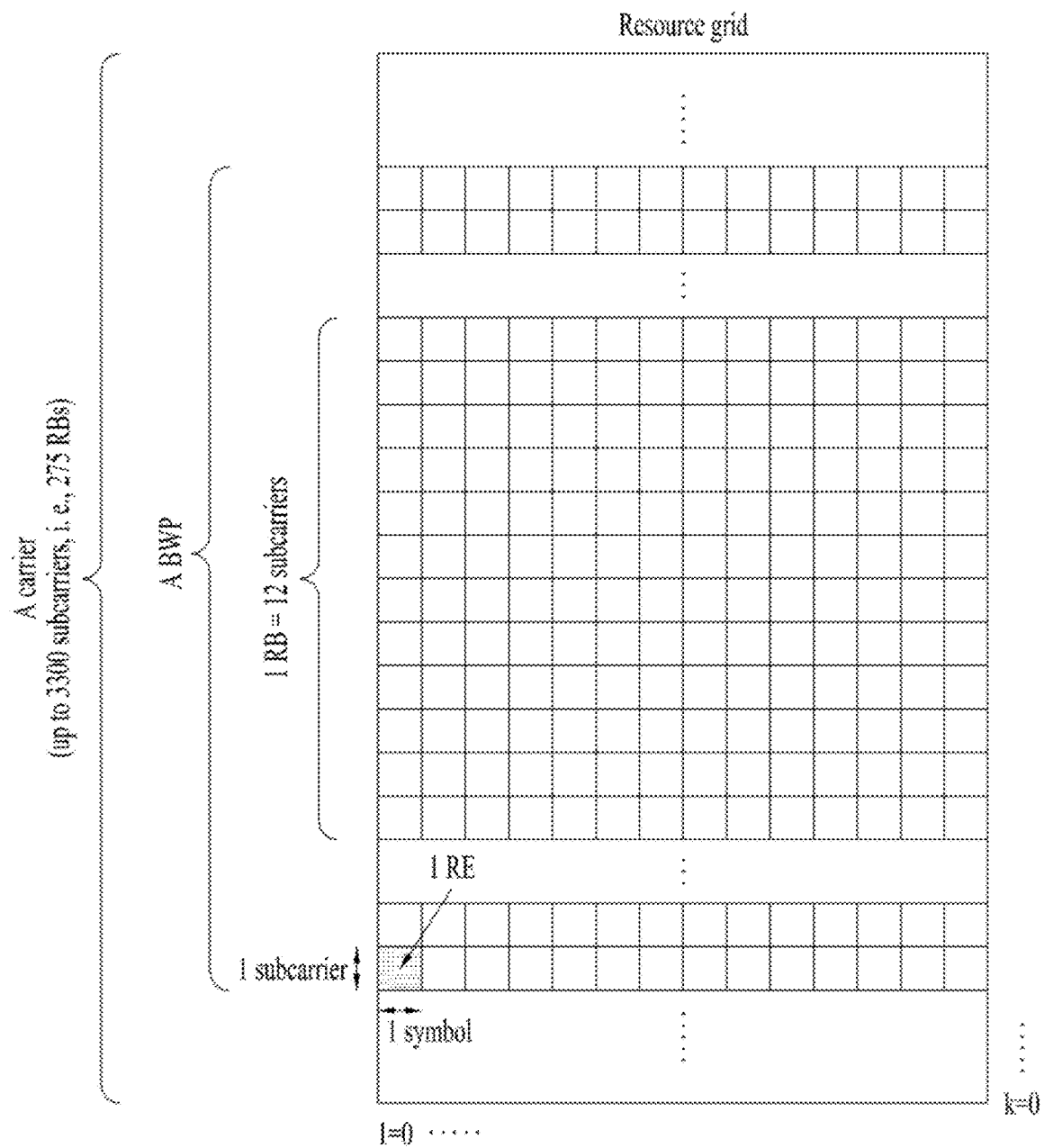

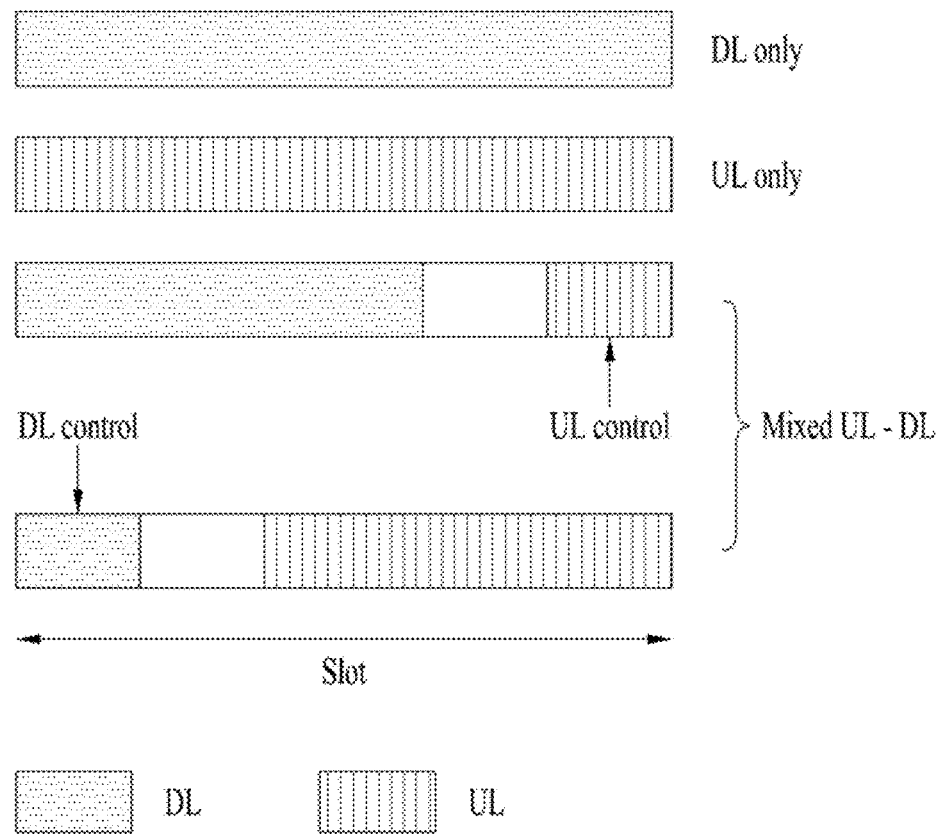
[Figure 4]

[Figure 5]
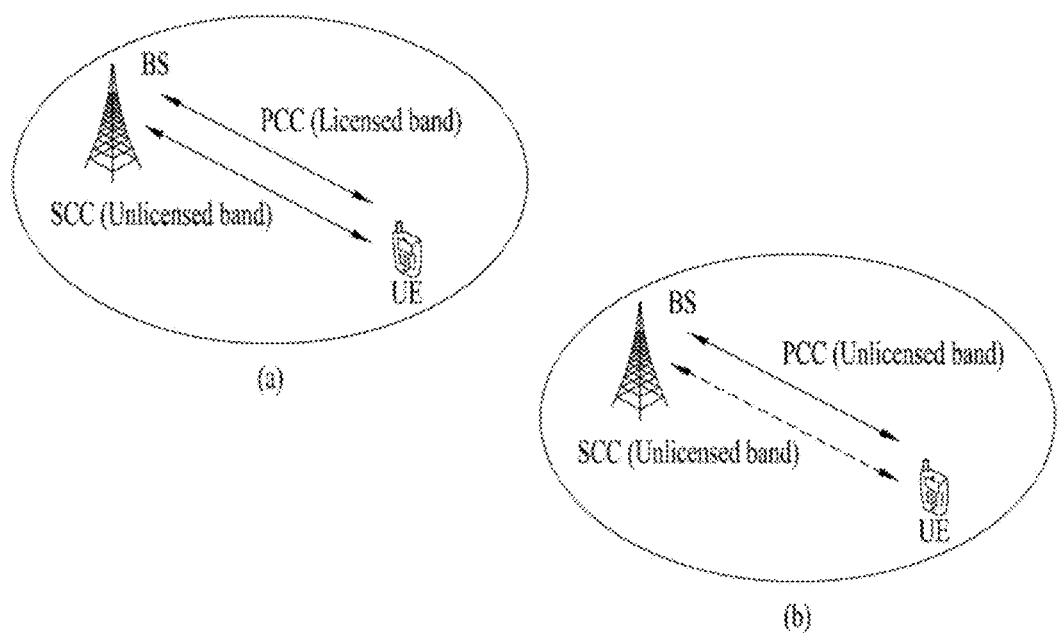

[Figure 6]
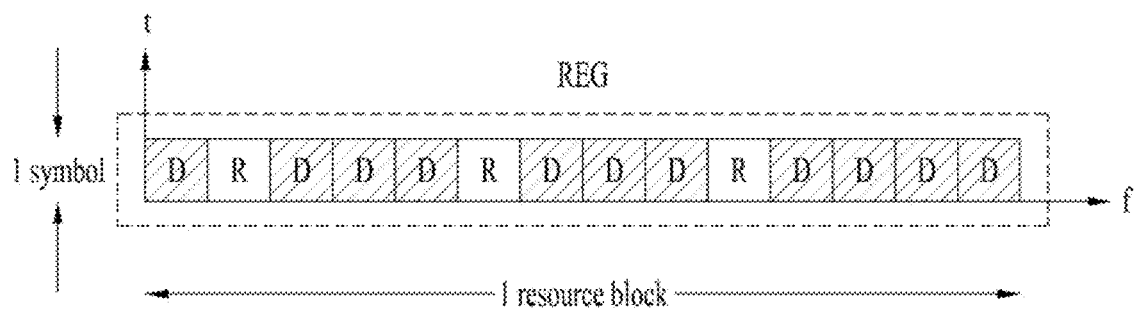

[Figure 7]
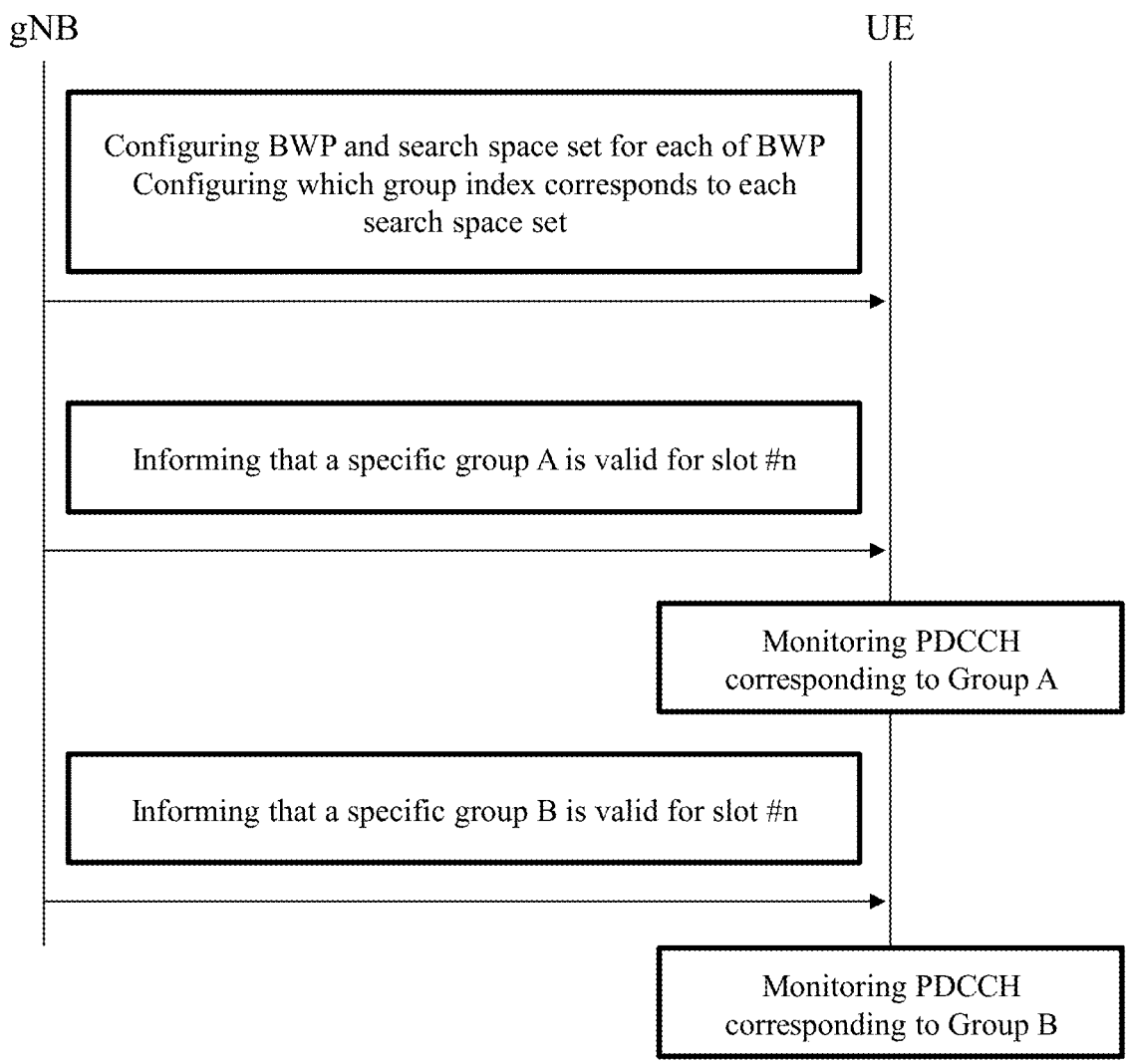

[Figure 8]
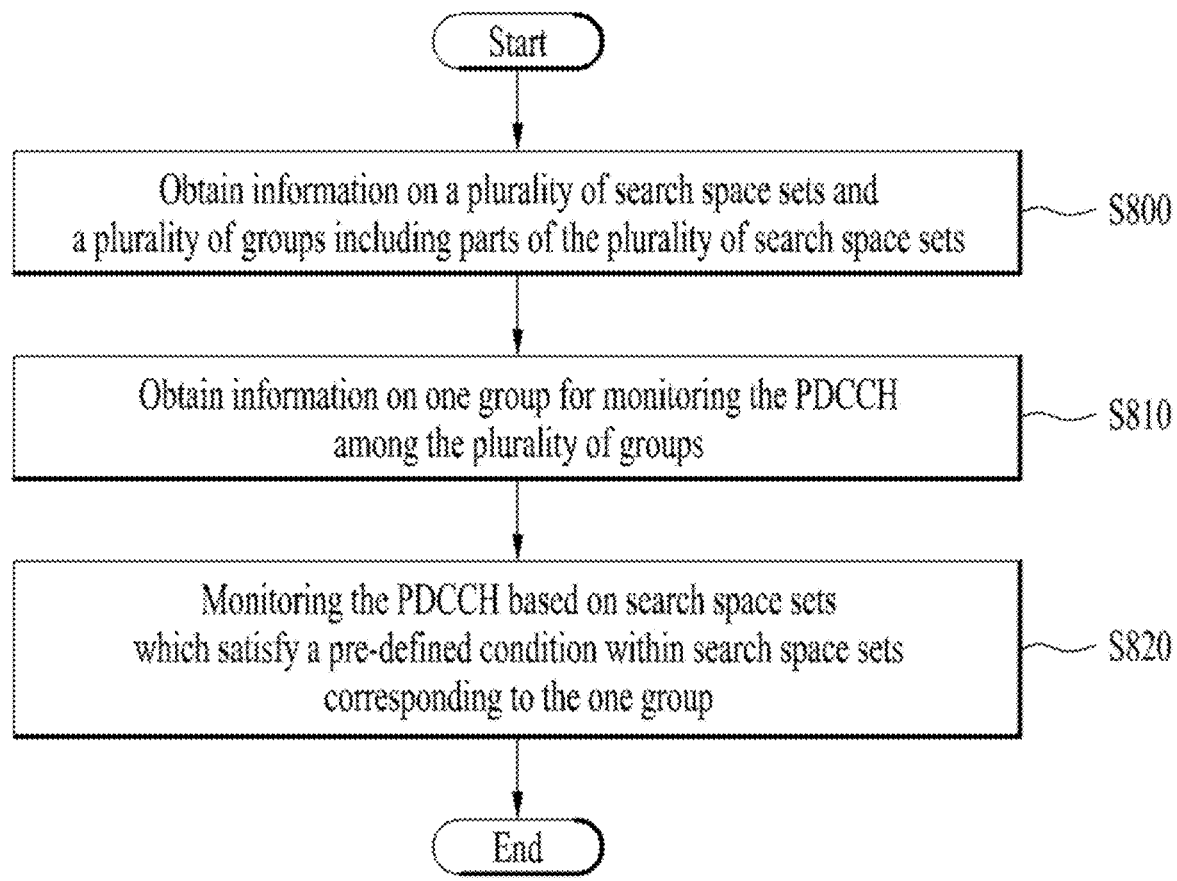

[Figure 9]
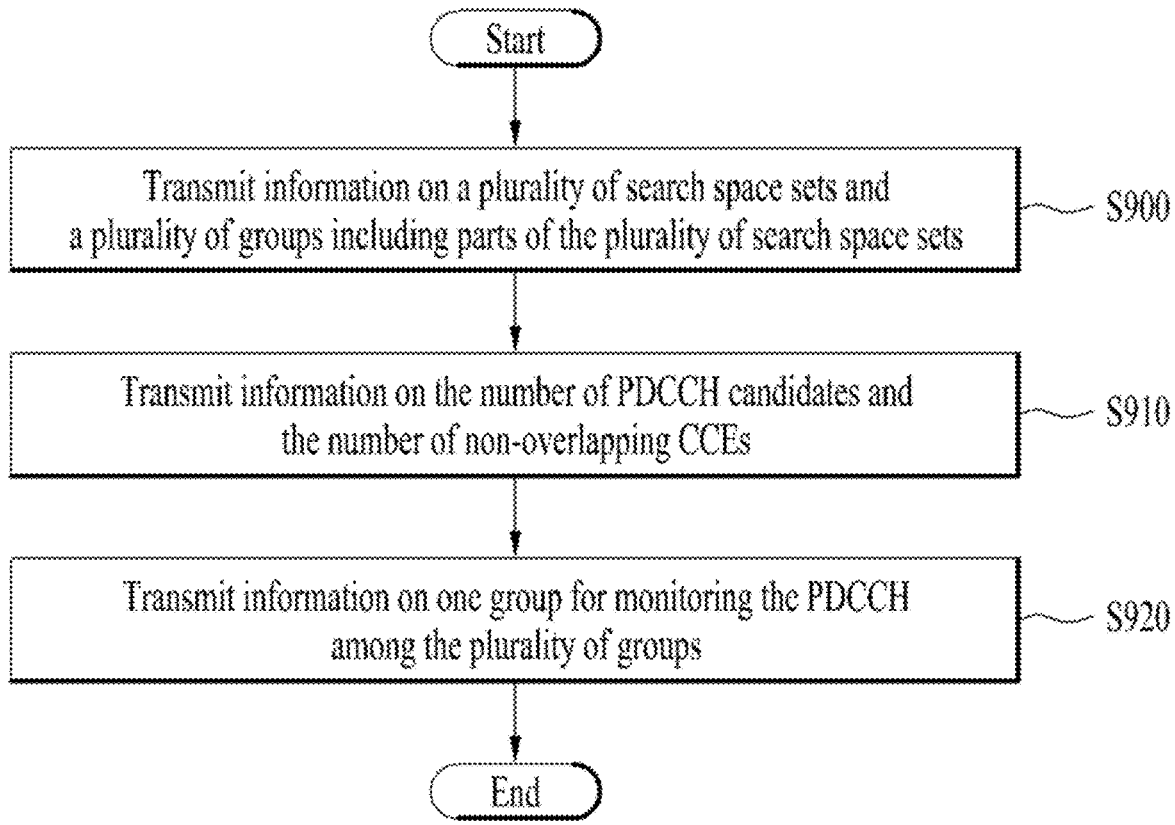

[Figure 10]
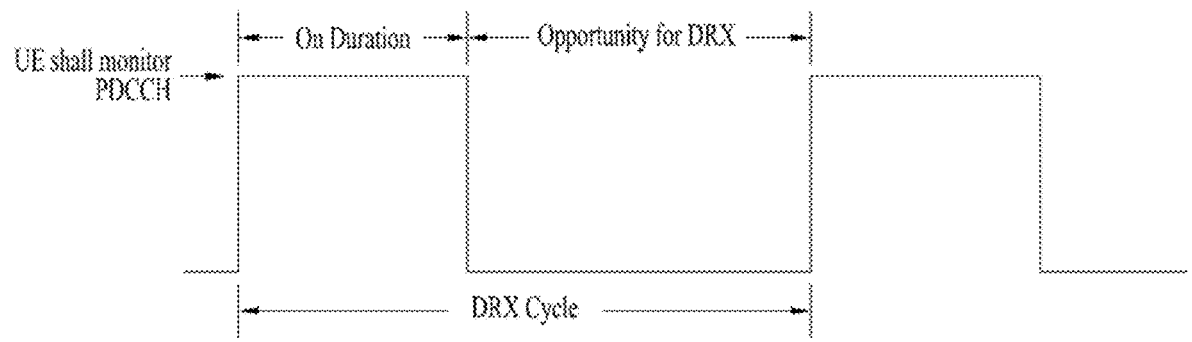

[Figure 11]
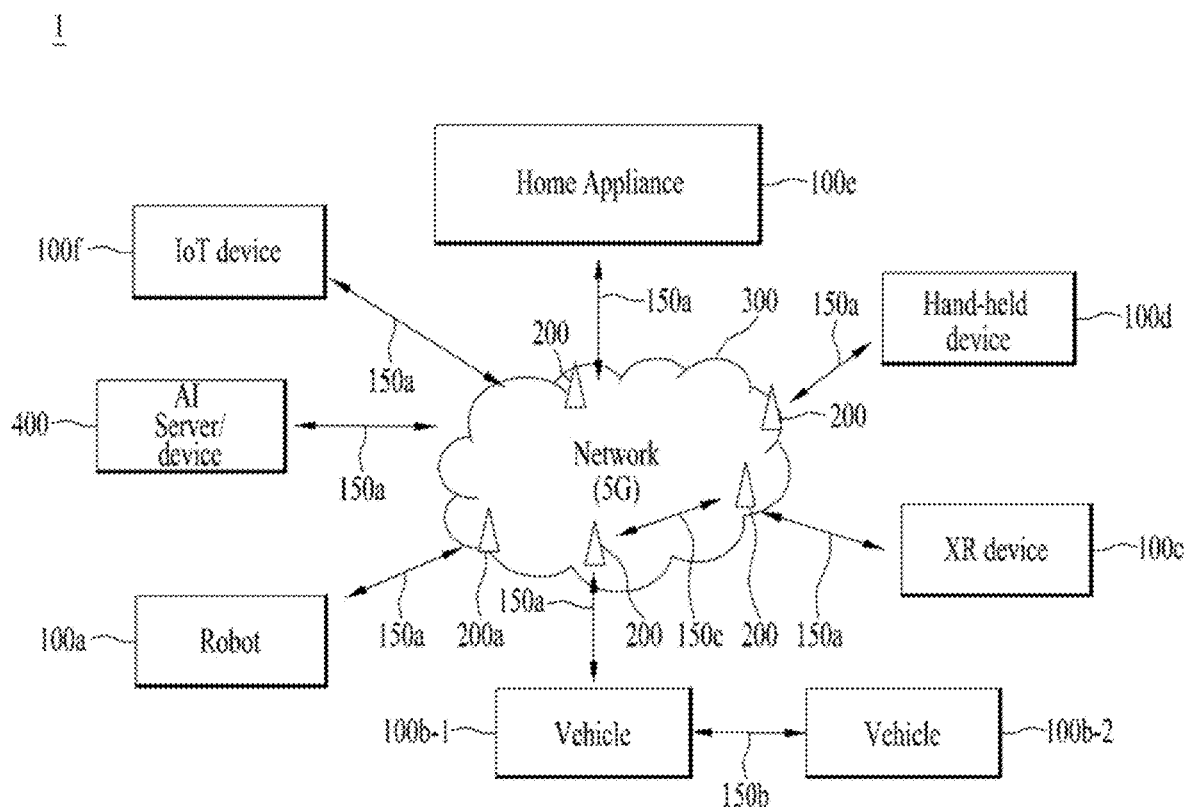

[Figure 12]
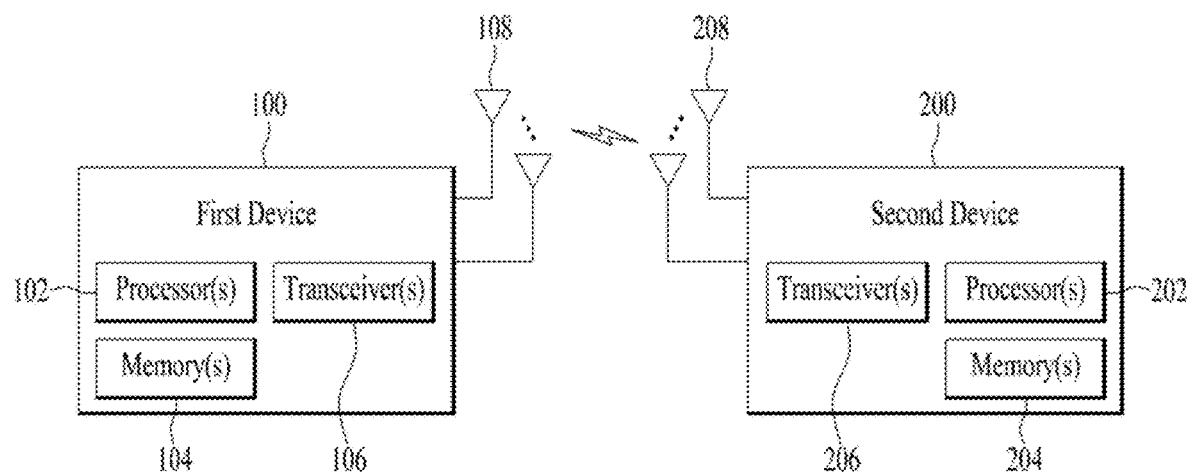

[Figure 13]
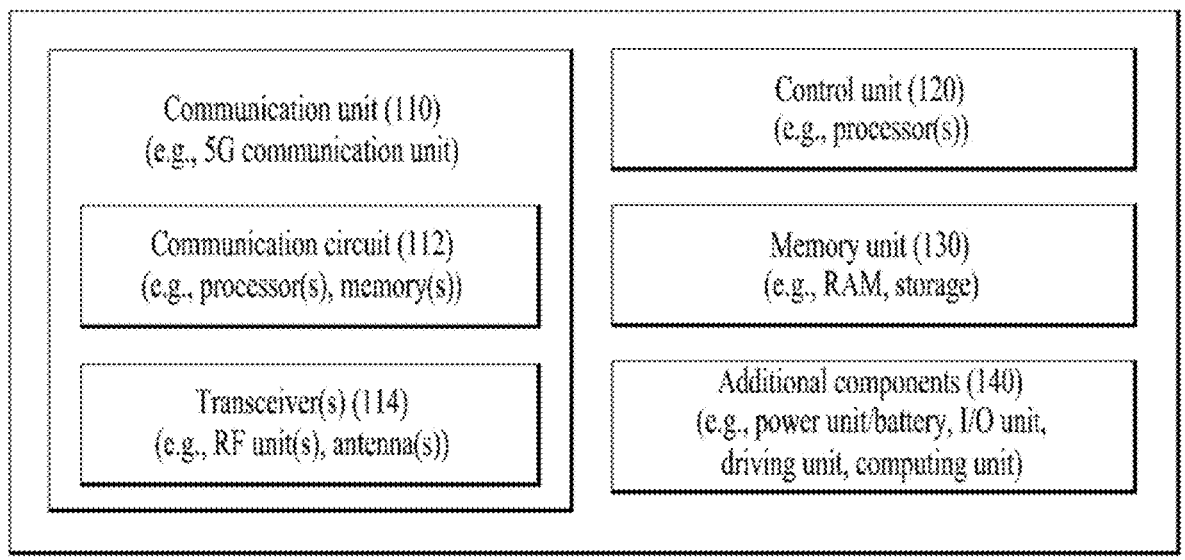

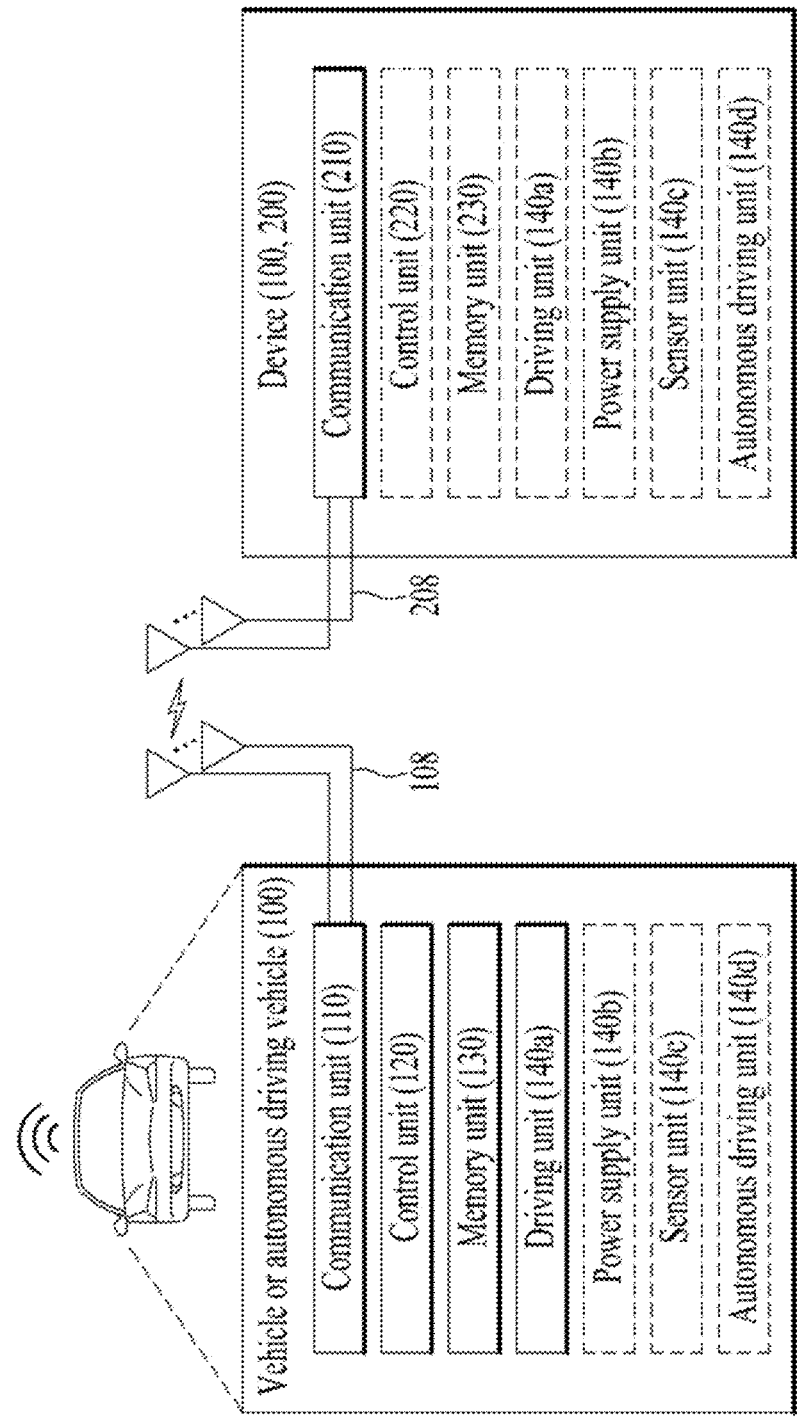
[Figure 14]

METHOD BY A USER EQUIPMENT INCLUDES PERFORMING PHYSICAL DOWNLINK CONTROL CHANNEL (PDCCH) MONITORING BASED ON A SEARCH SPACE SET SATISFYING A PREDETERMINED CONDITION

CROSS-REFERENCE TO RELATED APPLICATIONS

This application is the National Stage filing under 35 U.S.C. 371 of International Application No. PCT/KR2020/014964, filed on Oct. 29, 2020, which claims the benefit of earlier filing date and right of priority to Korean Application Nos. 10-2019-0135790, filed on Oct. 29, 2019, 10-2019-0141225, filed on Nov. 6, 2019, 10-2019-0156470, filed on Nov. 29, 2019, and 10-2020-0133305, filed on Oct. 15, 2020, the contents of which are all hereby incorporated by reference herein in their entireties.

TECHNICAL FIELD

The present disclosure relates to a wireless communication system, and more particularly, to a method and apparatus for transmitting and receiving a wireless signal.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An aspect of the present disclosure is to provide a method and apparatus for efficiently transmitting and receiving a wireless signal.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

In accordance with a first aspect of the present disclosure, a method for monitoring a physical downlink control channel (PDCCH) by a user equipment (UE) may include obtaining information about a plurality of search space sets and a plurality of groups including some parts of the plurality of search space sets; obtaining information about one group for monitoring the PDCCH from among the plurality of groups; and monitoring the PDCCH based on a search space set satisfying a predetermined condition from among search space sets corresponding to the one group, wherein the predetermined condition includes a condition in which the number of PDCCH candidates and the number of non-overlapping control channel elements (CCEs) are less than or equal to a specific value.

In accordance with a second aspect of the present disclosure, a method for transmitting a physical downlink control channel (PDCCH) by a base station (BS) may include transmitting information about a plurality of search space sets and a plurality of groups including some parts of the plurality of search space sets; transmitting information about one group for transmitting the PDCCH from among the plurality of groups; and transmitting the PDCCH based on a search space set satisfying a predetermined condition from among search space sets corresponding to the one group, wherein the predetermined condition includes a condition in which the number of PDCCH candidates and the number of non-overlapping control channel elements (CCEs) are less than or equal to a specific value.

In accordance with a third aspect of the present disclosure, a user equipment (UE) for monitoring a physical downlink control channel (PDCCH) may include at least one processor; and at least one computer memory operatively connected to the at least one processor, and configured to store instructions such that the at least one processor performs specific operations by executing the instructions. The specific operations include obtaining information about a plurality of search space sets and a plurality of groups including some parts of the plurality of search space sets; obtaining information about one group for monitoring the PDCCH from among the plurality of groups; and monitoring the PDCCH based on a search space set satisfying a predetermined condition from among search space sets corresponding to the one group, wherein the predetermined condition includes a condition in which the number of PDCCH candidates and the number of non-overlapping control channel elements (CCEs) are less than or equal to a specific value.

In accordance with a fourth aspect of the present disclosure, a base station (BS) for transmitting a physical downlink control channel (PDCCH) may include at least one processor; and at least one computer memory operatively connected to the at least one processor, and configured to store instructions such that the at least one processor performs specific operations by executing the instructions. The specific operations include: transmitting information about a plurality of search space sets and a plurality of groups including some parts of the plurality of search space sets; transmitting information about one group for transmitting the PDCCH from among the plurality of groups; and transmitting the PDCCH based on a search space set satisfying a predetermined condition from among search space sets corresponding to the one group, wherein the predetermined condition includes a condition in which the number of PDCCH candidates and the number of non-overlapping control channel elements (CCEs) are less than or equal to a specific value.

In accordance with a fifth aspect of the present disclosure, a device for a user equipment (UE) may include at least one processor; and at least one computer memory operatively connected to the at least one processor, and configured to store instructions such that the at least one processor performs specific operations by executing the instructions. The specific operations include: obtaining information about a plurality of search space sets and a plurality of groups including some parts of the plurality of search space sets; obtaining information about one group for monitoring a physical downlink control channel (PDCCH) from among the plurality of groups; and monitoring the PDCCH based on a search space set satisfying a predetermined condition from among search space sets corresponding to the one group, wherein the predetermined condition includes a condition in which the number of PDCCH candidates and the number of non-overlapping control channel elements (CCEs) are less than or equal to a specific value.

In accordance with a sixth aspect of the present disclosure, a device for a base station (BS) may include at least one processor; and at least one computer memory operatively connected to the at least one processor, and configured to store instructions such that the at least one processor performs specific operations by executing the instructions. The specific operations include: transmitting information about a plurality of search space sets and a plurality of groups including some parts of the plurality of search space sets; transmitting information about one group for transmitting a physical downlink control channel (PDCCH) from among the plurality of groups; and transmitting the PDCCH based on a search space set satisfying a predetermined condition from among search space sets corresponding to the one group, wherein the predetermined condition includes a condition in which the number of PDCCH candidates and the number of non-overlapping control channel elements (CCEs) are less than or equal to a specific value.

According to one embodiment, the plurality of search space sets may be a plurality of search space sets configured in a specific slot of a secondary cell or a plurality of common search space (CSS) sets configured in a specific slot of a primary cell.

According to one embodiment, the plurality of search space sets may be classified into a plurality of types based on whether each of the plurality of search space sets is included in at least one of the plurality of groups, and priority for applying the predetermined condition may be determined based on the plurality of types.

According to one embodiment, the plurality of types may include a first type, a second type, and a third type. A search space set, that is not included in all of the plurality of groups, may be included in the first type, a search space set, that is included in all of the two or more groups, may be included in the second type, and a search space set, that does not correspond to the first type and the second type, may be included in the third type.

According to one embodiment, the method may further include determining whether the search space sets corresponding to the one group satisfy the predetermined condition in the order of indexes of the search space sets corresponding to the one group.

According to one embodiment, the information about the one group for monitoring the PDCCH may include information about a group index corresponding to the one group.

According to one embodiment, the search space set corresponding to the one group may be pre-configured as one monitoring pattern, wherein the monitoring pattern includes a search space set not included in all of the plurality of groups, a search space set included in the one group, and search space sets other than search space sets included only in other groups excluding the one group from among the plurality of groups.

According to one embodiment, the method may further include receiving a downlink signal including information about the one group. The group for monitoring the PDCCH may be changed based on a time point when the downlink signal is received, and the PDCCH may be monitored based on the search space set satisfying the predetermined condition from among search space sets corresponding to the changed group.

According to one embodiment, the group for monitoring the PDCCH may be changed before the downlink signal is received or after a predetermined time has elapsed from the time point when the downlink signal is received.

According to one embodiment, the method may further include transmitting information about capability for monitoring the PDCCH to the base station, wherein the capability information is determined differently according to each group.

According to one embodiment, as the capability information is determined differently according to each group, a delay value to be applied when the group for monitoring the PDCCH is changed increases.

Advantageous Effects

According to the present disclosure, a wireless signal may be transmitted and received efficiently in a wireless communication system.

According to the present disclosure, when a plurality of search space sets configured for a specific BWP can be grouped, and when it is indicated for which group PDCCH monitoring is to be performed at a specific time point, a method for performing PDCCH monitoring for each group indicated by a user equipment (UE) can be configured.

According to the present disclosure, the space set to be used for monitoring searching is changed based on whether or not the space set is included in a channel occupancy time (COT) of the base station (BS), so that efficient PDCCH monitoring can be performed in terms of channel occupancy of the BS and power consumption of the UE.

According to the present disclosure, since a search space set scheduled to perform PDCCH monitoring based on a group of search space sets is determined, the search space sets can be prevented from being unnecessarily dropped.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 1 illustrates physical channels and a general signal transmission method using the physical channels in a 3rd generation partnership project (3GPP) system as an exemplary wireless communication system.

FIG. 2 illustrates a radio frame structure.

FIG. 3 illustrates a resource grid of a slot.

FIG. 4 illustrates mapping of physical channels in a slot.

FIG. 5 illustrates a wireless communication system supporting an unlicensed band.

FIG. 6 illustrates an example of one REG structure.

FIG. 7 is a flowchart illustrating an operation between a UE and a base station (BS).

FIGS. 8 and 9 are flowcharts illustrating operations of the UE and the BS according to an embodiment.

FIG. 10 illustrates an example of a DRX cycle.

FIGS. 11 to 14 illustrate a communication system 1 and wireless devices, which are applied to the present disclosure.

BEST MODE

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive machine type communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

Physical Channel and Frame Structure

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When powered on or when a UE initially enters a cell, the UE performs initial cell search involving synchronization with a BS in step S101. For initial cell search, the UE receives synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 orthogonal frequency division multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15*2^u) | $N^{slot}_{symb}$ | $N^{frame,u}_{slot}$ | $D^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot
*$N^{frame,u}_{slot}$: Number of slots in a frame
*$N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS (15*2^u) | $N^{slot}_{symb}$ | $N^{frame,u}_{slot}$ | $D^{subframe,u}_{slot}$ |
|---|---|---|---|
| 60 KHz (u = 2) | 12 | 40 | 4 |

The frame structure is merely an example. The number of subframes, the number of slots, and the number of symbols in a frame may vary. In the NR system, different OFDM numerologies (e.g., SCSs) may be configured for a plurality of cells aggregated for one UE. Accordingly, the (absolute time) duration of a time resource including the same number of symbols (e.g., a subframe (SF), slot, or TTI) (collectively referred to as a time unit (TU) for convenience) may be configured to be different for the aggregated cells. A symbol may be an OFDM symbol (or CP-OFDM symbol) or an SC_FDMA symbol (or a discrete Fourier transform-spread-OFDM (DFT-s-OFDM) symbol). In NR, various numerologies (or SCSs) are supported to support various 5G services. For example, with an SCS of 15 kHz, a wide area in traditional cellular bands is supported, while with an SCS of 30 kHz/60 kHz, a dense urban area, a lower latency, and a wide carrier bandwidth are supported. With an SCS of 60 kHz or higher, a bandwidth larger than 24.25 GHz is be supported to overcome phase noise. An NR frequency band may be defined by two types of frequency ranges, FR1 and FR2. FR1 and FR2 may be configured as described in Table 3. FR2 may refer to millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE. FIG. 4 is a diagram illustrating a self-contained slot structure in an NR system to which embodiments of the present disclosure are applicable. In the NR system, a frame is characterized by a self-contained structure in which all of a DL control channel, DL or UL data, and a UL control channel may be included in one slot. For example, the first N symbols of a slot may be used for a DL control channel (hereinafter, referred to as a DL control region), and the last M symbols of the slot may be used for a UL control channel (hereinafter, referred to as a UL control region). Each of N and M is an integer equal to or larger than 0. A resource area (referred to as a data region) between the DL control region and the UL control region may be used for transmission of DL data or UL data. For example, the following configuration may be considered. Respective sections are listed in a temporal order. 1. DL only configuration 2. UL only configuration 3. Mixed UL-DL configuration
   DL region+Guard period (GP)+UL control region
   DL control region+GP+UL region
   DL region: (i) DL data region, (ii) DL control region+DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

Wireless Communication System supporting Unlicensed band

FIG. 5 illustrates a wireless communication system supporting an unlicensed band.

For the convenience of description, a cell operating in a licensed band (hereinafter, referred to as L-band) is defined as an LCell, and a carrier of the LCell is defined as a (DL/UL) licensed component carrier (LCC). In addition, a cell operating in an unlicensed band (hereinafter, referred to as a U-band) is defined as a UCell, and a carrier of the UCell is defined as a (DL/UL) unlicensed component carrier (UCC). The carrier of a cell may refer to the operating frequency (e.g., center frequency) of the cell. A cell/carrier (e.g., CC) may be collectively referred to as a cell.

When carrier aggregation (CA) is supported, one UE may transmit and receive signals to and from a BS in a plurality of cells/carriers. When a plurality of CCs are configured for one UE, one CC may be configured as a primary CC (PCC) and the other CCs may be configured as secondary CCs (SCCs). Specific control information/channel (e.g., CSS PDCCH or PUCCH) may be configured to be transmitted and received only on the PCC. Data may be transmitted in the PCC/SCC. FIG. 5(a) illustrates signal transmission and reception between a UE and a BS in an LCC and a UCC (non-standalone (NSA) mode). In this case, the LCC may be configured as a PCC, and the UCC may be configured as an SCC. When a plurality of LCCs are configured for the UE, one specific LCC may be configured as a PCC, and the remaining LCCs may be configured as SCCs. FIG. 5(a) corresponds to LAA of a 3GPP LTE system. FIG. 5(b) illustrates signal transmission and reception between a UE and a BS in one or more UCCs without any LCC (SA mode). In this case, one of the UCCs may be configured as a PCC, and the remaining UCCs may be configured as SCCs. Both the NSA mode and the SA mode may be supported in the unlicensed band of the 3GPP NR system. Hereinafter, the operation of transmitting and receiving signals in an unlicensed band described in the present disclosure can be performed based on all of the above-described deployment scenarios (unless stated otherwise).

DL Channel Structures

An eNB transmits related signals on later-described DL channels to a UE, and the UE receives the related signals on the DL channels from the eNB.

(1) Physical Downlink Shared Channel (PDSCH)

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

(2) Physical Downlink Control Channel (PDCCH)

The PDCCH carries DCI and uses QPSK as a modulation scheme. One PDCCH includes 1, 2, 4, 8, or 16 control channel elements (CCEs) according to an aggregation level (AL). One CCE includes 6 resource element groups (REGs). One REG is defined by one OFDM symbol by one (P)RB. FIG. 5 is a diagram illustrating the structure of one REG. In FIG. 5, D represents an RE to which DCI is mapped, and R represents an RE to which a DMRS is mapped. The DMRS is mapped to REs #1, #5, and #9 along the frequency axis in one symbol.

The PDCCH may be transmitted in a control resource set (CORESET). The CORESET is defined as a set of resource element groups with a given numerology (e.g., SCS, CP length, and so on). A plurality of CORESETs for one UE may overlap with each other in the time/frequency domain. The CORESET may be configured by system information (e.g., master information block (MIB)) or by UE-specific higher layer signaling (e.g., radio resource control (RRC) signaling). Specifically, the number of RBs and the number of symbols (up to 3 symbols) included in the CORESET may be configured by higher layer signaling.

For each CORESET, a precoder granularity in the frequency domain is set to one of the followings by higher-layer signaling:

sameAsREG-bundle: It equals to an REG bundle size in the frequency domain.

allContiguousRBs: It equals to the number of contiguous RBs in the frequency domain within the CORESET.

The REGs of the CORESET are numbered in a time-first mapping manner. That is, the REGs are sequentially numbered in an increasing order, starting with 0 for the first OFDM symbol of the lowest-numbered RB in the CORESET.

The UE may obtain DCI transmitted over a PDCCH by decoding (blind decoding) a set of PDCCH candidates. The set of PDCCH candidates decoded by the UE is defined as a PDCCH search space set. A search space set may be a common search space (CSS) or a UE-specific search space (USS). The UE may obtain DCI by monitoring PDCCH candidates in one or more search space sets configured by an MIB or higher layer signaling. Each CORESET configuration may be associated with one or more search space sets, and each search space set may be associated with one CORESET configuration. One search space set may be determined based on the following parameters.

controlResourceSetId: A set of control resources related to the search space set monitoringSlotPeriodicityAndOffset: A PDCCH monitoring periodicity (in a unit of slot) and a PDCCH monitoring offset (in a unit of slot)

monitoringSymbolsWithinSlot: A PDCCH monitoring pattern (e.g., first symbol(s) in the CORESET) in a PDCCH monitoring slot nrofCandidates: The number of PDCCH candidates (one of 0, 1, 2, 3, 4, 5, 6, and 8) for each AL={1, 2, 4, 8, 16}

Table 4 shows the characteristics of each search space type.

TABLE 4

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 5 exemplarily shows DCI formats transmitted on the PDCCH.

TABLE 5

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to a UE, and DCI format 2_1 is used to deliver DL preemption information to a UE. DCI format 2_0 and/or DCI format 2_1 may be delivered to a corresponding group of UEs on a group common PDCCH which is a PDCCH directed to a group of UEs.

Specific Embodiments

Symbols/abbreviations/terms used herein are as follows.

PDCCH: Physical Downlink Control CHannel
PDSCH: Physical Downlink Shared CHannel
PUSCH: Physical Uplink Shared CHannel
CSI: Channel State Information
RRM: Radio Resource Management
RLM: Radio Link Monitoring
DCI: Downlink Control Information
CAP: Channel Access Procedure
Ucell: Unlicensed cell
TBS: Transport Block Size
SLIV: SLIV is an abbreviation for starting and length indicator value (SLIV). The SLIV may refer to an indication field indicating a start symbol index in a slot of PDSCH and/or PUSCH and the number of symbols included in the slot, and is loaded on a PDCCH that schedules the corresponding PDSCH and/or PUSCH.
BWP: BWP is an abbreviation for BandWidth Part (BWP). The BWP may include consecutive resource blocks (RBs) on the frequency axis, and may correspond to one numerology (e.g., sub-carrier spacing, CP length, and/or slot/mini-slot duration). In addition, although the plurality of BWPs is configured in one carrier (but the number of BWPs per carrier may also be restricted), the number of activated BWPs per carrier may be limited to a specific number of BWPs (e.g., one BWP).
CORESET: CORESET is an abbreviation for COntrol REsource SET. The CORESET may refer to a time-frequency resource domain to which a PDCCH can be transmitted, and the number of CORESETs per BWP may be restricted.
REG: Resource Element Group
SFI: SFI is an abbreviation for a Slot Format Indicator. The SFI may refer to an indicator for indicating a symbol level DL/UL direction of symbols included in specific slot(s), and may be transmitted over a group-common PDCCH.
COT: Channel Occupancy Time
SPS: Semi-Persistent Scheduling
PLMN ID: Public Land Mobile Network identifier In the Rel-15 MNR system, up to four BWPs can be set in one cell, and only one BWP from among the four BWPs can be activated. In addition, a search space set linked to one CORESET may be set, and up to ten search space sets may be set for each BWP. At this time, in each search space set, not only time-axis resources (period, offset, duration, and in-slot position) in which a linked CORESET will be located, but also which DCI format is coming (or which DCI format is being used in transmission), the number of PDCCH candidates for each aggregation level, etc. may be set. For example, the time axis resources in which the linked CORESET will be located can be set through parameters (such as a period, an offset, a duration, and an in-slot position), but is not limited thereto.

In the NR system on the unlicensed band, since it is possible to predict a CAP success time point of the base station (BS), setting the PDCCH monitoring period or the time instance interval to a considerably short time may be advantageous in terms of efficient channel occupancy of the base station (BS). However, if the PDCCH monitoring period or the time instance interval is set to be short, power consumption of the UE for PDCCH monitoring increases. Thus, within the COT obtained by the BS, setting the PDCCH monitoring period (or the period of a search space set) or the time instance interval to a relatively long time may be advantageous in terms of power consumption of the UE. Accordingly, it may be desirable that the PDCCH monitoring period (i.e., a monitoring pattern configured in the search space sets) be configured differently depending on whether or not the search space set belongs to the COT of the base station (BS).

In order to support the operation of setting a PDCCH monitoring pattern differently according to whether the search space set belongs to a COT of the base station (BS), RRC signaling for grouping the search space sets in the Rel-16 NR-U (or in an unlicensed band defined in the NR system or in a shared spectrum channel access-based NR system) has been introduced. At this time, the UE can be instructed by DCI signaling or the like to perform PDCCH monitoring for a search space set of a certain group. Alternatively, based on the COT structure of the base station (BS) recognized by the UE, the UE may directly recognize whether to perform PDCCH monitoring for a search space set of a certain group.

The present disclosure proposes a specific method for monitoring search space sets belonging to a specific group when the UE performs PDCCH monitoring.

As described above, for search space sets configured in a specific BWP specification, one or more groups may be configured. As an example, when 10 search space sets #0~#9 may be set in a specific BWP, and when two groups are configured for 10 search space sets, group #0 and group #1 can be set as follows:

Group #0: Search Space Sets #2/3/4/5/6
Group #1: Search Space Sets #4/5/6/7/8/9

In this case, a search space set (such as search space sets #0 and #1) that does not belong to any group may be present, and a search space set (such as search space sets #4~#6) that belongs to all groups may be present. In the case of a search space set that does not belong to any group or belongs to all groups, the UE can always perform monitoring even when PDCCH monitoring for a certain group is configured/indicated/recognized.

On the other hand, in the NR system, in consideration of implementation complexity of the UE, as described in Table 6, the maximum number of PDCCH candidates to be monitored by the UE per slot of a specific BWP and the maximum number of non-overlapping CCEs can be defined, and only PDCCH monitoring within preset conditions (i.e., satisfying a condition related to the maximum number of PDCCH candidates in Table 6 and the maximum number of non-overlapping CCEs) can be allowed.

TABLE 6

Table 10.1-2 provides the maximum number of monitored PDCCH candidates, $M_{PDCCH}^{max,slot,\mu}$, for a DL BWP with SCS configuration $\mu$ for a UE per slot for operation with a single serving cell.
Table 10.1-2: Maximum number $M_{PDCCH}^{max,slot,\mu}$ of monitored PDCCH candidates per slot for a DL BWP with SCS configuration $\mu \in \{0, 1, 2, 3\}$ for a single serving cell

| $\mu$ | Maximum number of monitored PDCCH candidates per slot and per serving cell $M_{PDCCH}^{max,slot,\mu}$ |
|---|---|
| 0 | 44 |
| 1 | 36 |
| 2 | 22 |
| 3 | 20 |

Table 10.1-3 provides the maximum number of non-overlapped CCEs, $C_{PDCCH}^{max,slot,\mu}$, for a DL TABLE 6-continued BWP with SCS configuration μ that a UE is expected to monitor corresponding PDCCH candidates per slot for operation with a single serving cell. CCEs for PDCCH candidates are non-overlapped if they correspond to different CORESET indexes, or different first symbols for the reception of the respective PDCCH candidates.
Table 10.1-3: Maximum number $C_{PDCCH}^{max,slot,\mu}$ of non-overlapped CCEs per slot for a DL BWP with SCS configuration μ ∈ {0, 1, 2, 3} for a single serving cell

| μ | Maximum number of non-overlapped CCEs per slot and per serving cell $C_{PDCCH}^{max,slot,\mu}$ |
|---|---|
| 0 | 56 |
| 1 | 56 |
| 2 | 48 |
| 3 | 32 |

Exceptionally, in the case of a specific cell (e.g., Primary Cell: PCell), the number of search space sets can be set to exceed the maximum number of PDCCH candidates defined per specific slot in the specific BWP and the maximum number of non-overlapping CCEs. That is, the number of search space sets can be configured such that a condition related to the maximum number of PDCCH candidates and the maximum number of non-overlapping CCEs is not satisfied. When considering that a period/offset/duration and the like can be set differently according to the search space sets in the PDCCH monitoring process based on the search space set setting, the search space set can be configured in a manner that a predetermined constraint condition (e.g., the maximum number of PDCCH candidates and the maximum number of non-overlapping CCEs) is not satisfied at a specific slot, but the above constraint condition is satisfied in another slot other than the specific slot. When considering a search space set in which PDCCH monitoring should be guaranteed at intervals of a specific time period in the same manner as in the common search space set, the number of remaining PDCCH candidates for each slot and the number of non-overlapping CCEs for each slot may be configured differently according to the respective slots. Therefore, in consideration of the configuration flexibility of the base station (BS), it may be necessary to allow setting of a search space set that does not satisfy the above-described constraint condition. At this time, if a constraint condition related to the maximum number of PDCCH candidates and the maximum number of non-overlapping CCEs is not satisfied in the specific slot, some parts of search space sets configured in the corresponding specific slot may be deactivated, thereby satisfying the constraint condition in all slots. In this case, as shown in Table 7, it may be determined which search space set will be dropped at a specific slot, which search space set will be deactivated, or which search space set will not be used for PDCCH monitoring. Specifically, the UE can determine whether the number of PDCCH candidates included in the configured search space sets is equal to or less than the maximum number of preset PDCCH candidates and the number of non-overlapping CCEs is equal to or less than the maximum number of non-overlapping CCEs. For example, the UE may determine whether the conditions of the maximum number of PDCCH candidates and the maximum number of non-overlapping CCEs are satisfied in the order of ascending indexes of the search space sets. As a result, the UE may drop or deactivate search space sets, each of which has a higher index value than the search space set not satisfying the above conditions.

When some of the search space sets configured in a specific slot are dropped (or deactivated), the common search space set(s) may not be dropped (or deactivated). Therefore, even when some of the set search space sets are dropped according to the rules shown in Table 7, the common search space set(s) may not be dropped and the UE may perform PDCCH monitoring for the common search space set(s). Accordingly, referring to Table 7, the maximum number ($M_{PDCCH}^{USS}$) of PDCCH candidates and the maximum number ($C_{PDCCH}^{USS}$) of non-overlapping CCEs can be determined based on the UE-specific search space sets, but is not limited thereto. In addition, the maximum number of PDCCH candidates may be determined by subtracting the number ($M_{PDCCH}^{CSS}$) of PDCCH candidates corresponding to the common search space set from min($M_{PDCCH}^{max,slot,\mu}$, $M_{PDCCH}^{total,slot,\mu}$), and the maximum number of non-overlapping CCEs may be determined by subtracting the number ($C_{PDCCH}^{CSS}$) of non-overlapping CCEs from min($C_{PDCCH}^{max,slot,\mu}$, $C_{PDCCH}^{total,slot,\mu}$). As can be seen from the equation $M_{PDCCH}^{USS}$=min($M_{PDCCH}^{max,slot,\mu}$, $M_{PDCCH}^{total,slot,\mu}$)−$M_{PDCCH}^{css}$ or $C_{PDCCH}^{uss}$=min($C_{PDCCH}^{max,slot,\mu}$, $C_{PDCCH}^{total,slot,\mu}$)−$C_{PDCCH}^{css}$ shown in Table 7, in a situation where the number ($M_{PDCCH}^{CSS}$) of PDCCH candidates corresponding to the common search space set or the number ($C_{PDCCH}^{CSS}$) of non-overlapping CCEs is excluded, when the plurality of PDCCH candidates is included in the common search space set, all of the plurality of PDCCH candidates can be excluded.

In addition, in the case of a Type0-PDCCH CSS (Common Search Space) set, a plurality of SS/PBCH block indices being QCL (Quasi Co-Location)-related to a specific SS/PBCH block candidate index may be present. In this case, the UE may have to perform PDCCH monitoring not only for the type0-PDCCH CSS set corresponding to each SS/PBCH block candidate index, but also for the type0-PDCCH CSS set corresponding to the SS/PBCH block candidate index having the QCL relationship. At this time, the UE may have to perform PDCCH monitoring for not only the type0-PDCCH CSS set corresponding to each SS/PBCH block candidate index, but also the type0-PDCCH CSS set corresponding to the SS/PBCH block candidate index in QCL relationship. For example, the base station (BS) may attempt to transmit a PDCCH for only one specific CSS set from among the type0-PDCCH CSS set corresponding to the SS/PBCH block candidate index and the other type0-PDCCH CSS set corresponding to the SS/PBCH block candidate index having a QCL relationship with the type0-PDCCH CSS set. However, since it is difficult for the UE to determine the actual transmission time point of the base station (BS), the UE may have to perform PDCCH monitoring not only for the type0-PDCCH CSS set corresponding to the SS/PBSCH block candidate index, but also for the type0-PDCCH CSS set having a QCL relationship with the type0-PDCCH CSS set. For example, if the type0-PDCCH CSS set for the SS/PBCH block candidate index #0 is configured in the slot #n, and if the type0-PDCCH CSS set for the SS/PBCH block candidate index #q (having a QCL relationship with the SS/PBCH block candidate index #0) can be configured in the slot #n+k, the UE can also exclude the number of PDCCH candidates for the CSS set (e.g., type0-PDCCH CSS set) configured not only in the slot #n, but also in the slot #n+k or the number of non-overlapping CCEs for the same CSS set configured in the slots (#n, #n+k). The above-described operation can be equally applied to another CSS set (e.g., a search space set for implementing paging DCI transmission) introduced to provide a channel access opportunity of the base station (BS) several times. In Equations $M_{PDCCH}^{USS}$, $C_{PDCCH}^{USS}$ of Table 7, excluding the number of PDCCH candidates corresponding to the CSS set or the number of non-overlapping CCEs corresponding to the CSS set can also be equally applied to the following proposed method.

TABLE 7

For all search space sets within a slot n, denote by $S_{css}$ a set of CSS sets with cardinality of $I_{css}$ and by $S_{uss}$ a set of USS sets with cardinality of $J_{uss}$. The location of USS sets $S_j$, $0 \leq j < J_{uss}$, in $S_{uss}$ is according to an ascending order of the search space set index.
Denote by $M_{S_{css}(i)}^{(L)}$, $0 \leq i < I_{css}$, the number of counted PDCCH candidates for monitoring for CSS set $S_{css}(i)$ and by $M_{S_{uss}(j)}^{(L)}$, $0 \leq j < J_{uss}$, the number of counted PDCCH candidates for monitoring for USS set $S_{uss}(j)$.
For the CSS sets, a UE monitors $$M_{PDCCH}^{CSS} = \sum_{i=0}^{I_{css}-1} \sum_{L} M_{S_{css}(i)}^{(L)}$$

PDCCH candidates requiring a total of $C_{PDCCH}^{CSS}$ non-overlapping CCEs in a slot.
The UE allocates PDCCH candidates for monitoring to USS sets for the primary cell having an active DL BWP with SCS configuration μ in slot n according to the following pseudocode. A UE does not expect to monitor PDCCH in a USS set without allocated PDCCH candidates for monitoring.
Denote by $V_{CCE}(S_{uss}(j))$ the set of non-overlapping CCEs for search space set $S_{uss}(j)$ and by $C(V_{CCE}(S_{uss}(j)))$ the cardinality of $V_{CCE}(S_{uss}(j))$ where the non-overlapping CCEs for search space set $S_{uss}(j)$ are determined considering the allocated PDCCH candidates for monitoring for the CSS sets and the allocated PDCCH candidates for monitoring for all search space sets $S_{uss}(k)$, $0 \leq k \leq j$.
Set $M_{PDCCH}^{uss} = \min(M_{PDCCH}^{max,slot,\mu}, M_{PDCCH}^{total,slot,\mu}) - M_{PDCCH}^{css}$
Set $C_{PDCCH}^{uss} = \min(C_{PDCCH}^{max,slot,\mu}, C_{PDCCH}^{total,slot,\mu}) - C_{PDCCH}^{css}$
Set j = 0 while $\sum_{L} M_{S_{uss}(j)}^{(L)} \leq M_{PDCCH}^{uss}$ AND $C(V_{CCE}(S_{uss}(j))) \leq C_{PDCCH}^{uss}$ allocate $\sum_{L} M_{S_{uss}(j)}^{(L)}$ PDDCH candidates for monitoring to USS set $S_{uss}(j)$ $M_{PDCCH}^{uss} = M_{PDCCH}^{uss} - \sum_{L} M_{S_{uss}(J)}^{(L)}$;

$C_{PDCCH}^{uss} = C_{PDCCH}^{uss} - C(V_{CCE}(S_{uss}(j)))$;
j = j + 1 ;
end while Hereinafter, when search space sets are grouped as in the above example, the present disclosure proposes a PDCCH monitoring method based on constraint conditions about the maximum number of PDCCH candidates and the maximum number of non-overlapping CCEs.

1) Receiver (Entity A; e.g., UE):

[Method #1] For all search space sets (regardless of grouping for the search space set) (within the activated BWP), the search space sets scheduled to perform monitoring for each slot can be determined in a manner that constraints for the maximum number of PDCCH candidates and the maximum number of non-overlapping CCEs can be satisfied. In addition, if the specific group A is configured/indicated/recognized to monitor the PDCCH, it is expected that the UE does not perform monitoring for a search space set that does not belong to the following search space sets (i.e., search spaces sets set configured not to belong to any group and search space sets configured to belong to Group A). That is, if the specific group A is configured/indicated/recognized to monitor the PDCCH, it is expected that the UE will perform monitoring only for a search space set belonging to the search space sets.

Search spaces set(s) configured not to belong to any group
Search space set(s) configured to belong to Group A For example, 10 search space sets (i.e., search space sets #0~#9) can be set in the activated BWP, and two groups can be set as follows for all search space sets. At this time, the search space set #0 from among the 10 search space sets may be a CSS set, and the remaining search space sets (search space sets #1~#9) may be UE-specific search space sets.

Group #0: Search Space Sets #2/4/6/8
Group #1: Search Space Sets #2/3/5/7/9

The UE may be configured to monitor all of the ten search space sets at a specific slot #n. According to Method #1, the rules shown in Table 7 can be used regardless of grouping for the search space sets. In this case, the rules shown in Table 7 can be sequentially determined in the order of ascending indexes (e.g., search space sets #0 to #9) of the search space sets. Accordingly, PDCCH monitoring for the search space set #0 corresponding to the CSS set, and PDCCH monitoring for the search space sets #1, #2, #3, and #4 corresponding to UE-specific search space sets can be allowed.

If PDCCH monitoring for Group #0 is configured/indicated/recognized, the UE may perform PDCCH monitoring for search space sets #0/1/2/4 in the slot #n, and may not perform PDCCH monitoring for the search space set #3 in the slot #n. In other words, if PDCCH monitoring for group #0 is configured/indicated/recognized in the UE, from among the search space sets #0/1/2/3/4 in which PDCCH monitoring is allowed, the UE may perform monitoring for the search space set #0, the search space set #1 not belonging to any group, and the search space sets (#2, #4) belonging to Group #0, and may not perform monitoring for the search space set #3 belonging to Group #1. Alternatively, if PDCCH monitoring for Group #1 is configured/indicated/ recognized in the UE, the UE may perform PDCCH monitoring for the search space sets #0/1/2/3 in the slot #n, and may not perform PDCCH monitoring for the search space set #4 in the slot #n. That is, from among the search space sets #0/1/2/3/4 in which PDCCH monitoring is allowed, the UE may perform monitoring for the search space set #0, the search space set #1 not belonging to any group, and the search space sets (#2, #3) belonging to Group #0, and may not perform monitoring for the search space set #4 belonging to only Group #0.

The above-described proposed method can also be applied to CSS sets for each specific slot of a specific cell. Specifically, the UE may not expect that the number of the CSS sets for each specific slot of a specific cell is set to exceed the constraint condition related to the maximum number of PDCCH candidates and the maximum number of non-overlapping CCEs. That is, for common search space sets for each specific slot of a specific cell, the UE may not expect a configuration that does not satisfy constraints about the maximum number of PDCCH candidates and the maximum number of non-overlapping CCEs. At this time, regardless of whether the CSS sets are configured to belong to a specific group, the UE may not expect a configuration that does not satisfy constraints on the maximum number of PDCCH candidates within a specific slot of a specific cell and the maximum number of non-overlapping CCEs.

Alternatively, the above-described proposed method can be applied to all search space sets for each specific slot of a specific secondary cell. Specifically, for all search space sets configured for each specific slot of a specific secondary cell, the UE may not expect that the number of search space sets is set to exceed constraints on the maximum number of PDCCH candidates and the maximum number of non-overlapping CCEs. In other words, the UE may not expect a configuration that does not satisfy constraints on the maximum number of PDCCH candidates and the maximum number of non-overlapping CCEs, for all search space sets for each specific slot of a specific secondary cell. At this time, regardless of whether the search space sets configured for each specific slot of a specific secondary cell are configured to belong to a specific group, the UE may not expect a configuration that does not satisfy the constraints on the maximum number of PDCCH candidates within a specific slot of a specific cell and the maximum number of non-overlapping CCEs.

[Method #2]

For all search space sets configured (in the activated BWP) in consideration of grouping for a search space set, search space sets scheduled to perform monitoring for each slot may be determined to satisfy constraints on the maximum number of PDCCH candidates and the maximum number of non-overlapping CCEs as shown in Table 7. That is, a separate PDCCH monitoring pattern (or different PDCCH monitoring patterns) can be configured depending on which group of PDCCH monitoring at a specific slot is configured/indicated/recognized in the UE. In addition, if PDCCH monitoring for a specific group is configured/indicated/recognized in the UE, the UE can perform PDCCH monitoring by applying a specific one pattern among the plurality of configured patterns. In other words, when PDCCH monitoring for a specific group at a specific slot is configured/indicated/recognized in the UE, some search space sets that are guaranteed not to be used among all search space sets configured (in the activated BWP) can be excluded. In addition, as shown in Table 2, the search space sets scheduled to perform monitoring for each slot can be determined to satisfy constraints on the maximum number of PDCCH candidates and the maximum number of non-overlapping CCEs.

When 10 search space sets (search space sets #0 to #9) are configured in a specific BWP, the following two groups can be configured as one example of grouping for search space sets. In this case, the search space set #0 may be a CSS set, and the remaining search space sets may be UE-specific search space sets. In the case of the CSS set, there is a need for the UE to perform monitoring at all times. In the following example, it is assumed that the UE monitors all of the 10 search space sets at a specific slot #n.

Group #0: Search Space Sets #2/4/6/8
Group #1: Search Space Sets #2/3/5/7/9

As an example, as the PDCCH monitoring pattern #1 for the slot #n, the search space sets #1/2/4/6/8 (i.e., the search space sets not belonging to any group, the search space sets belonging to Group #0, and the remaining search space sets other than the search space sets belonging to only Group #1) can be defined. According to the result of applying the rules shown in Table 7 to the search space sets #1/2/4/6/8 belonging to the PDCCH monitoring pattern #1, PDCCH monitoring can be allowed not only for the search space set #0 corresponding to the CSS set, but also for search space sets #1/2/4 corresponding to UE-specific search space sets. Here, when the rules shown in Table 7 are applied in PDCCH monitoring pattern #1, the rules can be sequentially applied to the search space sets arranged in the order of ascending indexes. For example, the UE may determine whether conditions on the maximum number of PDCCH candidates and the number of non-overlapping CCEs are satisfied in the order of ascending indexes of the search space sets #1/2/4/6/8 belonging to the PDCCH monitoring pattern #1. In addition, as the PDCCH monitoring pattern #2 for the slot #n, the search space sets #1/2/3/5/7/9 (i.e., the search space sets not belonging to any group, the search space sets belonging to Group #1, and the remaining search space sets other than the search space sets belonging to only Group #0) can be defined. According to the result of applying the rules shown in Table 7 to the search space sets #1/2/3/5/7/9 belonging to the PDCCH monitoring pattern #2, PDCCH monitoring can be allowed not only for the search space set #0 corresponding to the CSS set, but also for search space sets #1/2/3/5 corresponding to UE-specific search space sets.

In addition, when PDCCH monitoring for Group #0 in the slot #n is configured/indicated/recognized in the UE, the UE may perform PDCCH monitoring for search space sets (e.g., search space sets #0/1/2/4) satisfying the rules shown in Table 7 in the PDCCH monitoring pattern #1 within the slot #n. Alternatively, when PDCCH monitoring for Group #1 in the slot #n is configured/indicated/recognized in the UE, the UE may perform PDCCH monitoring for search space sets (e.g., search space sets #0/1/2/3/5) satisfying the rules shown in Table 7 in the PDCCH monitoring pattern #2 within the slot #n. At this time, the search space set #0 can always be monitored as a CSS set.

That is, in the above-described method #1, regardless of grouping for the search space sets, the rules shown in Table 7 may be used to determine the search space sets to be monitored by the UE. Accordingly, according to Method #1, the search space sets satisfying conditions on the maximum number of PDCCH candidates and the maximum number of non-overlapping CCEs can be determined sequentially according to the indexes of the search space sets. In addition, when PDCCH monitoring for a specific group is configured/indicated/recognized, some search space sets from among the search space sets satisfying the above condition can be dropped based on the configured/indicated/recognized specific group. For example, it is determined whether the above condition was sequentially satisfied in the order of ascending indexes of the search space sets, so that the search space sets (i.e., search space sets #1/2/3/4) satisfying the above condition can be determined. In addition, when PDCCH monitoring for Group #1 from among Group #0 and Group #1 is configured/indicated/recognized, the UE may drop the search space set #1 not belonging to any group and the remaining search space sets (#4) other than the search space sets belonging to Group #1. Accordingly, the UE may perform monitoring for the CSS set #0 and the search space sets #1/2/3.

In contrast, according to Method #2, the rules shown in Table 7 may be applied in consideration of grouping for the search space sets. Accordingly, when PDCCH monitoring for a specific group is configured/indicated/recognized, search space sets satisfying a condition related to the maximum number of PDCCH candidates and the number of non-overlapping CCEs can be determined in a PDCCH monitoring pattern configured based on the configured/indicated/recognized specific group. Specifically, different PDCCH monitoring patterns can be defined according to the groups to be monitored by the UE. For example, the monitoring pattern #1 corresponding to Group #0 may include i) search space set(s) not belonging to any group, ii) search space sets belonging to Group #0, and iii) the remaining search space set(s) other than the search space sets belonging to only Group #1. The monitoring pattern #2 corresponding to Group #1 may include i) search space set(s) not belonging to any group, ii) search space sets belonging to Group #1, and iii) the remaining search space set(s) other than the search space sets belonging to only Group #0. If PDCCH monitoring for Group #1 is configured/indicated/recognized, the UE can apply the rules shown in Table 7 to the search space sets #1/2/3/5/7/9 belonging to the monitoring pattern #2. Accordingly, the UE may perform monitoring for the search space sets #1/2/3/5 and the CSS set #0. Accordingly, when the rules shown in Table 7 are applied in consideration of grouping of search space sets in the same manner as Method #2, the UE may perform PDCCH monitoring for many more search space sets than in Method #1. According to Method #1, since the rules shown in Table 7 are applied without considering the grouping of search space sets, search space set(s) to be monitored by the UE may be unnecessarily excluded.

As another example, (UE-specific) search space sets can be divided into three types as follows, and the rules shown in Table 7 can be applied according to priorities defined/configured/indicated in advance for each type.

Type 1: Search space sets (for example, search space set #1) that do not belong to any group Type 2: Search space sets (for example, search space set #2) belonging to all groups Type 3: Other search space sets For example, if priority is defined/configured/indicated in the order of Type 1→Type 2→Type 3, the rules shown in Table 7 can be preferentially applied to search space sets belonging to Type 1 at a specific slot #n. Thereafter, when the rules shown in Table 7 are applied, values corresponding to the number of remaining PDCCH candidates and the number of non-overlapping CCEs can be applied to search space sets belonging to Type 2. Thereafter, when the rules shown in Table 7 are applied, a value corresponding to the number of remaining PDCCH candidates and the number of non-overlapping CCEs can be applied to search space sets belonging to Type 3. That is, a search space set scheduled to be monitored by the UE according to the rules shown in Table 7 can be determined according to the priorities of Type 1, Type 2, and Type 3. Specifically, the UE may first determine whether the search space sets belonging to Type 1 satisfy the condition on the maximum number of PDCCH candidates and the maximum number of non-overlapping CCEs. If all search space sets belonging to Type 1 satisfy the above condition, the UE may determine whether the search space sets belonging to Type 2 satisfy not only the number of remaining PDCCH candidates (other than both the number of PDCCH candidates and the number of non-overlapping CCEs corresponding to Type 1), but also the number of non-overlapping CCEs. If all search space sets belonging to Type 2 satisfy the conditions, the UE may determine whether the search space sets belonging to Type 3 satisfy not only the number of remaining PDCCH candidates (other than both the number of PDCCH candidates corresponding to Type 2 and the number of non-overlapping CCEs corresponding to Type 2), but also the number of non-overlapping CCEs. In addition, one or more search space sets not satisfying the condition from among all search space sets belonging to Type 3 may be dropped. For search space sets belonging to Type 3, when the rules shown in Table 7 are applied, two PDCCH monitoring patterns can be separately defined. That is, for search space sets belonging to Type 3, when the rules shown in Table 7 are applied, the rules shown in Table 7 can be applied for each PDCCH monitoring pattern. Specifically, according to the result of applying the rules shown in Table 7 to the search space sets #4/6/8 (i.e., search space sets belonging to only Group #0) as the PDCCH monitoring pattern #1, PDCCH monitoring for the search space set #4 can be allowed. That is, according to the result of applying the rules shown in Table 7 to the search space sets #4/6/8 (i.e., search space sets belonging to only Group #0) corresponding to Type 3 from among the search space sets #1/2/4/6/8 included in the PDCCH monitoring pattern #1, PDCCH monitoring for the search space set #4 can be allowed. At this time, the UE may determine whether the above rules are satisfied in the order of ascending indexes of the search space sets #4/6/8. If only the search space set #4 satisfies the above condition, the remaining search space sets #6/8 can be dropped. Therefore, the UE may perform PDCCH monitoring for the search space set #4 satisfying the above rules, the search space set #1 belonging to Type 1, and the search space set #2 belonging to Type 2 from among search space sets of PDCCH monitoring pattern #1 belonging to Type 3. According to the result of applying the rules shown in Table 7 to the search space sets #3/5/7/9 (i.e., search space sets belonging to only Group #1) as the PDCCH monitoring pattern #2 for the slot #n, PDCCH monitoring for the search space sets #3/5 can be allowed. In other words, according to the result of applying the rules shown in Table 7 to the search space sets #3/5/7/9 belonging to Type 3 from among the search space sets #1/2/3/5/7/9 belonging to the PDCCH monitoring pattern #2, PDCCH monitoring for the search space sets #3/5 can be allowed. Here, the UE can determine whether search space sets belonging to Type 3 satisfy conditions based on a value obtained by subtracting the number of PDCCH candidates corresponding to Type 1 and Type 2 and the number of non-overlapping CCEs corresponding to Type 1 and Type 2 from the maximum number of preset PDCCH candidates and the maximum number of non-overlapping CCEs. The UE may determine whether the above condition is satisfied in the order of ascending indexes of the search space sets #3/5/7/9. If only the search space sets #3/5 are satisfied, the remaining search space sets #7/9 may be dropped. Therefore, the UE may perform PDCCH monitoring for search space sets #3/5 satisfying the rules shown in Table 7, the search space set #1 belonging to Type 1, search space set #2 belonging to Type 2 from among search space sets corresponding to the PDCCH monitoring pattern #2 belonging to Type 3.

When PDCCH monitoring for Group #0 in the slot #n is configured/indicated/recognized in the UE, the UE can perform PDCCH monitoring for search space sets belonging to Type 1 and Type 2 in the slot #n, and at the same time can perform PDCCH monitoring for the PDCCH monitoring pattern #1 (e.g., PDCCH monitoring for search space sets #0/1/2/4) in the slot #n. Alternatively, when PDCCH monitoring for Group #1 is configured/indicated/recognized in the UE in the slot #n, the UE can perform PDCCH monitoring (e.g., PDCCH monitoring for the search space sets #0/1/2/3/5) for the PDCCH monitoring pattern #2 as well as PDCCH monitoring for the search space sets belonging to Types 1 and 2 in the slot #n. Specifically, when the PDCCH monitoring for Group #0 is configured/indicated/recognized in the UE in the slot #n, the UE can apply the rules shown in Table 7 in the order of search space sets belonging to Type 1→search space sets belonging to Type 2→search space sets belonging to Type 3. Accordingly, the UE can perform PDCCH monitoring for search space sets (search space sets #1/2) belonging to Type 1 and Type 2, and can also perform PDCCH monitoring for search space sets satisfying the rules shown in Table 7 from among search space sets of the PDCCH monitoring pattern #1 belonging to Type 3. In addition, the UE can perform PDCCH monitoring for search space set #0 corresponding to a CSS set. In addition, when the PDCCH monitoring for Group #1 is configured/indicated/recognized in the UE in the slot #n, the UE can perform PDCCH monitoring for search space sets (search space set #1/2) belonging to Type 1 and Type 2, and can also perform PDCCH monitoring for search space sets satisfying the rules show in Table 7 from among search space sets of PDCCH monitoring pattern #2 belonging to Type 3. In addition, the UE can perform PDCCH monitoring for search space set #0 corresponding to the CSS set.

The above-described proposed method can also be applied to CSS sets for each specific slot of a specific cell. Specifically, the UE may not expect a configuration that does not satisfy the constraints on the maximum number of PDCCH candidates and the maximum number of non-overlapping CCEs in association with the CSS sets for each specific slot of a specific cell. In this case, if the CSS sets are configured to belong to a specific group, in consideration of grouping as in the above-described proposed method, the UE may not expect a configuration that does not satisfy constraints on the maximum number of PDCCH candidates and the maximum number of non-overlapping CCEs within a specific slot of a specific cell.

For example, it is assumed that, when search space sets #0/1/2/3 are common search space (CSS) sets, the CSS set #0 does not belong to any group, the CSS set #1 belongs to all groups #0/1, the CSS set #2 belongs to group #0, and the CSS set #3 belongs to group #1. In addition, it is assumed that at a specific slot #n, the UE is configured to monitor all of the above four search space sets. In association with the CSS sets #0/1/2 at a specific slot #n, the UE may not expect a configuration that does not satisfy constraints on the maximum number of PDCCH candidates and the maximum number of non-overlapping CCEs. At this time, the search space sets #0/1/2 may correspond to the PDCCH monitoring pattern #1. In association with the CSS sets #0/1/3 at a specific slot #n, the UE may not expect a configuration that does not satisfy constraints on the maximum number of PDCCH candidates and the maximum number of non-overlapping CCEs. At this time, the search space sets #0/1/3 may correspond to the PDCCH monitoring pattern #2.

If PDCCH monitoring for group #0 at the slot #n is configured/indicated/recognized in a UE, the UE can perform PDCCH monitoring for CSS sets #0/1/2. Alternatively, if PDCCH monitoring for group #1 is configured/indicated/recognized in the UE at the slot #n, the UE can perform PDCCH monitoring for CSS sets #0/1/3.

Alternatively, the above-described proposed method can also be applied to search space sets for each specific slot of a specific secondary cell. Specifically, in association with all search space sets configured for each specific slot of a specific secondary cell, the UE may not expect a configuration that does not satisfy constraints on the maximum number of PDCCH candidates and the maximum number of non-overlapping CCEs. In this case, if the search space sets can be configured to belong to a specific group, in consideration of grouping of the search space sets as in the above-described proposal, the UE may not expect a configuration that does not satisfy constraints on the maximum number of PDCCH candidates and the maximum number of non-overlapping CCEs within a specific slot of a specific secondary cell. That is, the UE may not expect a configuration that does not satisfy constraints on the maximum number of PDCCH candidates and the maximum number of non-overlapping CCEs, for each search space set group configured in a specific slot of a specific secondary cell.

For example, it is assumed that, when search space sets #0/1/2/3 are configured in a specific slot of a specific secondary cell, the search space set #0 does not belong to any group, the search space set #1 belongs to groups #0/1, the search space set #2 belongs to group #1, and the search space set #3 belongs to group #1. In addition, it is assumed that, at a specific slot #n, the UE is configured to monitor all of the above four search space sets. At this time, in association with the search space sets #0/1/2 (i.e., search space sets corresponding to the group #0) at the specific slot #n, the UE may not expect a configuration that does not satisfy constraints on the maximum number of PDCCH candidates and the maximum number of non-overlapping CCEs. In addition, in association with the search space sets #0/1/3 (i.e., search space sets corresponding to Group #1) at a specific slot #n, the UE may not expect a configuration that does not satisfy constraints on the maximum number of PDCCH candidates and the maximum number of non-overlapping CCEs. In this case, when PDCCH monitoring for group #0 at the slot #n is configured/indicated/recognized in a UE, the UE can perform PDCCH monitoring for search space sets #0/1/2. Alternatively, when PDCCH monitoring for group #1 is configured/indicated/recognized in a UE at the slot #n, the UE can perform PDCCH monitoring for the search space sets #0/1/3.

In addition, in association with search space sets (to be monitored when monitoring for a specific group is configured/indicated) corresponding to a specific group (e.g., Group #1) configured for each specific slot from among the group #0 and the group #1 configured in a specific cell (e.g., a primary cell), the UE may not expect a configuration that does not satisfy constraints on the maximum number of PDCCH candidates and the maximum number of non-overlapping CCEs. That is, the UE may not expect a configuration that does not satisfy constraints on the maximum number of PDCCH candidates and the maximum number of non-overlapping CCEs for each search space set group configured in a specific slot of a specific cell.

For example, it is assumed that the search space set #0 does not belong to any group, the search space set #1 belongs to groups #0/1, the search space set #2 belongs to group #0, and the search space set #3 belongs to group #1. In addition, it is assumed that the UE is configured to monitor all of the four search space sets at a specific slot #n. When monitoring for Group #1 is configured/indicated/performed in a specific slot #n, the UE may perform PDCCH monitoring for search space sets #0/1/3 in the corresponding slot #n. At this time, for the search space sets #0/1/3 in the corresponding slot #n, the UE may not expect a configuration that does not satisfy constraints on the maximum number of PDCCH candidates and the maximum number of non-overlapping CCEs.

In the present disclosure, the operations for setting/instructing/recognizing PDCCH monitoring for a specific group by the UE may mean at least one of the following methods.

According to the discovery of a specific downlink (DL) signal/channel (e.g., a DM-RS (Demodulation Reference Signal) linked to a specific PDCCH and/or a CORESET, a UE-specific DCI, a group-common DCI, and a cell-specific DCI, PDCCH monitoring for a particular group can be instructed. For example, before a corresponding DL signal/channel is discovered, and after lapse of a specific time period after the discovery of the corresponding DL signal/channel, PDCCH monitoring corresponding to Group A (e.g., that is pre-defined/pre-configured as a specific group index (e.g., Group Index #0), or a group index corresponding to a shorter period from among a minimum period A of the search space sets belonging to Group #0 and a minimum period B of the search space sets belonging to Group #1) may be performed. Within a specific time period after the discovery of the corresponding DL signal/channel, PDCCH monitoring corresponding to Group B (e.g., that is pre-defined/pre-configured as a specific group index (e.g., Group Index #1), or a group index corresponding to a longer period from among a minimum period A of the search space sets belonging to Group #0 and a minimum period B of the search space sets belonging to Group #1) may be performed. At this time, the specific time period may be pre-defined, or may refer to a time period until the COT is ended in a situation where information (e.g., the length of the remaining COT) about the COT occupied by the base station (BS) is signaled. Alternatively, the specific time period may refer to a time period until the COT is ended (e.g., the last slot instructed by SFI information) when COT-related information is signaled through DCI carrying SFI information.

PDCCH monitoring for a specific group can be instructed according to the base station COT information included in a specific DL channel (e.g., UE-specific DCI, group-common DCI, and cell-specific DCI). For example, if it is possible to indicate whether the UE is located inside or outside the COT range of the base station (BS) in the corresponding DL channel, PDCCH monitoring corresponding to Group A (e.g., that is pre-defined/pre-configured as a specific group index (e.g., Group Index #0), or a group index corresponding to a shorter period from among a minimum period A of the search space sets belonging to Group #0 and a minimum period B of the search space sets belonging to Group #1) can be performed within the COT. In addition, when the UE is located outside the COT range, PDCCH monitoring corresponding to Group B (e.g., that is pre-defined/pre-configured as a specific group index (e.g., Group Index #1), or a group index corresponding to a longer period from among a minimum period A of the search space sets belonging to Group #0 and a minimum period B of the search space sets belonging to Group #1) can be performed. According to the present disclosure, the reason why PDCCH monitoring is less frequently performed within the COT range and PDCCH monitoring is more frequently performed at a position located outside the COT range are considered preferable is as follows. From the viewpoint of the base station (BS), the BS can receive an opportunity capable of more frequently acquiring a channel prior to channel occupation. From the viewpoint of the UE, the UE performs PDCCH monitoring less frequently after the base station (BS) has occupied the channel, such that power consumption of the UE can be reduced.

Information about which group will be used for PDCCH monitoring in a specific DL signal/channel (e.g., DM-RS linked to a specific PDCCH and/or CORESET, UE-specific DCI, group-common DCI, and cell-specific DCI) can be directly instructed. For example, when Group A is instructed in the corresponding DL channel, the UE may perform PDCCH monitoring corresponding to Group A (within the COT). When Group B is instructed, the UE may perform PDCCH monitoring corresponding to Group B. When the corresponding DL channel is a group-common DCI (for example, DCI format 2_0) capable of carrying channel occupancy (CO) or COT information of the base station (BS), the UE may perform PDCCH monitoring corresponding to Group A within the COT. In addition, although the UE does not receive the DCI indicating Group B, the UE may perform PDCCH monitoring corresponding to Group B at a position outside the COT. For example, Group B may be pre-defined/pre-configured as a specific group index (e.g., Group Index #0), or may be a group index corresponding to a shorter period from among a minimum period A of the search space sets belonging to Group #0 and a minimum period B of the search space sets belonging to Group #1. Alternatively, in a situation where the corresponding DL channel is a UE-specific DCI, when the corresponding DCI indicates Group A, the UE may perform PDCCH monitoring corresponding to Group A within a specific time period (e.g., within the maximum COT value of the BS or during the pre-defined/pre-configured timer expiration) from the DCI discovery. Thereafter, even when the UE does not receive the DCI indicating Group B, the UE may perform PDCCH monitoring corresponding to Group B after lapse of a predetermined time period from the DCI discovery. In this case, Group B may be pre-defined/pre-configured as a specific group index (e.g., Group Index #0), or may be a group index corresponding to a shorter period from among a minimum period A of the search space sets belonging to Group #0 and a minimum period B of the search space sets belonging to Group #1.

One or more specific time periods may be pre-configured, and the group of search space sets to be monitored within each of the pre-configured time periods may be pre-defined/pre-configured. For example, when a specific time period X is configured, the UE may perform PDCCH monitoring corresponding to Group A during the time period X, and may perform PDCCH monitoring corresponding to Group B during the remaining time periods other than the time period X. Alternatively, when a specific time period X and a time period Y are configured, the UE may perform PDCCH monitoring corresponding to Group A during the time period X, and may perform PDCCH monitoring corresponding to Group B during the time period Y. In this case, the time period X may refer to an ON duration of a discontinuous reception (DRX) cycle, or may refer to an active time introduced for the purpose of power saving. Alternatively, when the BS or UE applies a frame based equipment (FBE) operation based on ETSI BRAN regulation, the time period X may be the first K symbols of each FFP (fixed frame period) or may be a time period that is predefined/preconfigured of each FFP.

If one or more CSS (Common Search Space) sets (e.g., type3-PDCCH search space sets) corresponding to the group-common DCI (e.g., DCI format 2_0) capable of carrying CO or COT information of the BS are configured, and if the respective CSS sets are configured to belong to different search space set groups, SFI information corresponding to each group may be configured separately (or differently). The reason why the SFI information corresponding to each group is configured separately (or differently) is as follows. Under the condition that the number of slots indicated by SFI information is equal to or higher than the number of monitoring occasions (MOs) of the CSS set, if the monitoring occasion (MO) periods of the CSS sets of the respective groups are configured differently from each other, a minimum number of slots to be indicated by SFI information may be changed for each group. As an example, when the MO period of the CSS set belonging to Group A is composed of 4 slots, and when the MO period of the CSS set belonging to Group B is composed of only one slot, minimal information of SFI information provided through the group-common DCI corresponding to Group A may be 4 slots, and minimal information of SFI information provided through the group-common DCI corresponding to Group B may be 1 slot. In other words, the base station (BS) may configure separate RRC signaling for each group to satisfy the corresponding minimum information condition, and SFI information for more than a time period corresponding to the maximum value (e.g., four slots in the above example) from among the conditions of the minimum information for each group can be RRC-signaled for group-common DCI corresponding to all groups.

[Method #3]

The UE may report, to the base station (BS), the capability related to PRCCH monitoring for each span (defined in Table 8), and a plurality of search space set groups may be configured. When the UE reports a plurality of (X, Y) combinations using the PDCCH monitoring-related capability, a specific combination (X, Y) can be determined by the following rules (Option 1 or Option 2).

Option 1: (X, Y) combination can be determined for each search space set group, and the UE can expect that (X, Y) combinations calculated for the respective group are the same.

Option 2: If (X, Y) combination is determined for each search space set group, and if (X, Y) combinations calculated for the respective groups are different from each other, the P_switch value of Table V10.4-1 can be additionally required. For example, if (X, Y) combinations calculated for the respective groups are different from each other, a value greater than a predetermined P_switch value may be required according to Table 10.4-1 of Table 9. Referring to Table 13, "searchSpaceSwitchingDelay-r16" may indicate a P_switch value serving as a delay value that is applied to the UE switching the search space set group, and this P_switch value may be denoted by the number of symbols. In this case, the UE can expect that, a new P_switch value is to be defined when the respective groups have different (X, Y) combinations, an alpha (α) value is to be added to the existing P_switch value when the respective groups have different (X, Y) combinations, or a P_switch value equal to or greater than a specific threshold is to be set when the respective groups have different (X, Y) combinations.

As described in Tables 8 to 10 below, the combination (X, Y) may mean that PDCCH monitoring occasion (MO) is set in a situation where a gap of at least X symbols is present between two spans within one slot and each span includes a maximum of Y symbols. In this case, the span may refer to a time domain consisting of consecutive symbols configured to monitor the PDCCH within a specific slot.

TABLE 8

A UE can indicate a capability to monitor PDCCH according to one or more of the combinations (X, Y) = (2, 2), (4, 3), and (7, 3) per SCS configuration of $\mu = 0$ and $\mu = 1$. A span is a number of consecutive symbols in a slot where the UE is configured to monitor PDCCH. Each PDCCH monitoring occasion is within one span. If a UE monitors PDCCH on a cell according to combination (X, Y), the UE supports PDCCH monitoring occasions in any symbol of a slot with minimum time separation of X symbols between the first symbol of two consecutive spans, including across slots. A span starts at a first symbol where a PDCCH monitoring occasion starts and ends at a last symbol where a PDCCH monitoring occasion ends, where the number of symbols of the span is up to Y.
If a UE indicates a capability to monitor PDCCH according to multiple (X, Y) combinations and a configuration of search space sets to the UE for PDCCH monitoring on a cell results to a separation of every two consecutive PDCCH monitoring spans that is equal to or larger than the value of X for one or more of the multiple combinations (X, Y), the UE monitors PDCCH on the cell according to the combination (X, Y), from the one or more combinations (X, Y), that is associated with the largest maximum number of $M_{PDCCH}^{max,(X,Y),\mu}$ and $C_{PDCCH}^{max,(X,Y),\mu}$ defined in Table 10.1-2A and Table 10.1-3A. The UE expects to monitor PDCCH according to the same combination (X, Y) in every slot on the active DL BWP of a cell.
A UE capability for PDCCH monitoring per slot or per span on an active DL BWP of a serving cell is defined by a maximum number of PDCCH candidates and non-overlapped CCEs the UE can monitor per slot or per span, respectively, on the active DL BWP of the serving cell.

TABLE 9

Table 10.1-2A provides the maximum number of monitored PDCCH candidates, $M_{PDCCH}^{max,(X,Y),\mu}$, per span for a UE in a DL BWP with SCS configuration TABLE 9-continued μ for operation with a single serving cell. Table 10.1-2A:
Maximum number $M_{PDCCH}^{max,(X,Y),\mu}$ of monitored
PDCCH candidates in a span for combination (X, Y)
for a DL BWP with SCS configuration $\mu \in \{0, 1\}$ for a single serving cell

| | Maximum number $M_{PDCCH}^{max,(X,Y),\mu}$ of monitored PDCCH candidates per span for combination (X, Y) and per serving cell | | |
|---|---|---|---|
| μ | (2, 2) | (4, 3) | (7, 3) |
| 0 | 14 | 28 | 44 |
| 1 | 12 | 24 | 36 |

Table 10.1-3A provides the maximum number of
non-overlapped CCEs, $C_{PDCCH}^{max,(X,Y),\mu}$, for a
DL BWP with SCS configuration μ that a UE is
expected to monitor corresponding PDCCH candidates
per span for operation with a single serving cell.
Table 10.1-3A: Maximum number $C_{PDCCH}^{max,(X,Y),\mu}$
of non-overlapped CCEs in a span for
combination (X, Y) for a DL BWP with SCS
configuration $\mu \in \{0, 1\}$ for a single
serving cell

| | Maximum number $C_{PDCCH}^{max,(X,Y),\mu}$ of non-overlapped CCEs per span for combination (X, Y) and per serving cell | | |
|---|---|---|---|
| μ | (2, 2) | (4, 3) | (7, 3) |
| 0 | 18 | 36 | 56 |
| 1 | 18 | 36 | 56 |

TABLE 11

10.4 Search space set group switching A UE can be
provided a group index for a respective Type3-PDCCH
CSS set or USS set by searchSpaceGroupIdList-r16
for PDCCH monitoring on a serving cell. If the UE is not
provided searchSpaceGroupIdList-r16 for a search space set,
the following procedures are not applicable for PDCCH
monitoring according to the search space set. If a UE is provided
searchSpaceSwitchingGroupList-r16, indicating one or more
groups of serving cells, the following procedures apply
to all serving cells within each group; otherwise, the following
procedures apply only to a serving cell for which the
UE is provided searchSpaceGroupIdList-r16.
When a UE is provided searchSpaceGroupIDList-r16,
the UE resets PDCCH monitoring according to search space
sets with group index 0, if provided by searchSpaceGroupIdList-r16.
A UE can be provided by searchSpaceSwitchingDelay-r16 a number of
symbols $P_{switch}$ where a minimum value of $P_{switch}$ is provided in
Table 10.4-1 for UE processing capability 1 and UE processing
capability 2 and SCS configuration μ. UE processing capability 1 for SCS
configuration μ applies unless the UE indicates support for UE processing
capability 2. Table 10.4-1: Minimum value of $P_{switch}$ [symbols]

| μ | Minimum $P_{switch}$ value for UE processing capability 1 [symbols] | Minimum $P_{switch}$ value for UE processing capability 2 [symbols] |
|---|---|---|
| 0 | 25 | 10 |
| 1 | 25 | 12 |
| 2 | 25 | 22 |

TABLE 10

If a UE is configured only with $N_{cells,r16}^{DL,\mu}$ downlink cells for which the UE is provided
monitoringCapabilityConfig-r16 = r16monitoringcapability and with associated PDCCH
candidates monitored in the active DL BWPs of the scheduling cells using SCS configuration
μ, and with $N_{cells,r16}^{DL,(X,Y),\mu}$ of the $N_{cells,r16}^{DL,\mu}$ downlink cells using combination (X, Y) for PDCCH
monitoring, where $\Sigma_{\mu=0}^{1} N_{cells,r16}^{DL,\mu} > N_{cells}^{cap-r16}$, a DL BWP of an activated cell is the active DL
BWP of the activated cell, and a DL BWP of a deactivated cell is the DL BWP with index
provided by firstActiveDownlinkBWP-Id for the deactivated cell, the UE is not required to
monitor more than $M_{PDCCH}^{total,(X,Y),\mu} = \lfloor N_{cells}^{cap-r16} \cdot M_{PDCCH}^{max,(X,Y),\mu} \cdot N_{cells,r16}^{DL,(X,Y),\mu}/\Sigma_{j=0}^{1} N_{cells,r16}^{DL,j} \rfloor$
PDCCH candidates or more than $C_{PDCCH}^{total,(X,Y),\mu} = \lfloor N_{cells}^{cap-r16} \cdot C_{PDCCH}^{max,(X,Y),\mu} \cdot N_{cells,r16}^{DL,(X,Y),\mu}/\Sigma_{j=0}^{1} N_{cells,r16}^{DL,j} \rfloor$ non-overlapped CCEs
- per set of spans on the active DL BWP(s) of all scheduling cell(s) from the $N_{cells,r16}^{DL,(X,Y),\mu}$
  downlink cells within every X symbols, if the union of PDCCH monitoring occasions
  on all scheduling cells from the $N_{cells,r16}^{DL,(X,Y),\mu}$ downlink cells results to PDCCH
  monitoring according to the combination (X, Y) and any pair of spans in the set is
  within Y symbols, where first X symbols start at a first symbol with a PDCCH
  monitoring occasion and next X symbols start at a first symbol with a PDCCH
  monitoring occasion that is not included in the first X symbols
- per set of spans across the active DL BWP(s) of all scheduling cells from the
  $N_{cells,r16}^{DL,(X,Y),\mu}$ downlink cells, with at most one span per scheduling cell for each set of
  spans, otherwise where $N_{cells,r16}^{DL,j}$ is a number of configured cells with associated PDCCH candidates
monitored in the active DL BWPs of the scheduling cells using SCS configuration j. If a UE
is configured with downlink cells for which the UE is provided both
monitoringCapabilityConfig-r16 = r15monitoringcapability and
monitoringCapabilityConfig-r16 = r16monitoringcapability, $N_{cells}^{cap-r16}$ is replaced by $N_{cells,r16}^{cap-r16}$.
For each scheduled cell from the $N_{cells,r16}^{DL,(X,Y),\mu}$ downlink cells using combination (X, Y), the UE
is not required to monitor on the active DL BWP with SCS configuration μ of the scheduling
cell, more than min ($M_{PDCCH}^{max,(X,Y),\mu}$, $M_{PDCCH}^{total,(X,Y),\mu}$) PDCCH candidates or more than
min ($C_{PDCCH}^{max,(X,Y),\mu}$, $C_{PDCCH}^{total,(X,Y),\mu}$) non-overlapped CCEs per span.
A UE does not expect to be configured CSS sets that result to corresponding total, or per
scheduled cell, numbers of monitored PDCCH candidates and non-overlapped CCEs per slot
or per span that exceed the corresponding maximum numbers per slot or per span,
respectively.

TABLE 12

A UE can be provided, by searchSpaceSwitchingTimer-r16, a timer value. The UE decrements the timer value by one after each slot for a reference SCS configuration μ.
If a UE is provided by SearchSpaceSwitchTrigger-r16 a location of a search space set group switching flag field for a serving cell in a DCI format 2_0, as described in Clause 11.1.1;
- if the UE detects a DCI format 2_0 and a value of the search space set group switching flag field in the DCI format 2_0 is 0, the UE starts monitoring PDCCH according to search space sets with group index 0, and stops monitoring PDCCH according to search space sets with group index 1, on the serving cell at a first slot that is at least $P_{switch}$ symbols after the last symbol of the PDCCH with the DCI format 2_0
- if the UE detects a DCI format 2_0 and a value of the search space set group switching flag field in the DCI format 2_0 is 1, the UE starts not monitoring PDCCH according to search space sets with group index 1, and stops monitoring PDCCH according to search space sets with group index 0, on the serving cell at a first slot that is at least $P_{switch}$ symbols after the last symbol of the PDCCH with the DCI format 2_0, and the UE sets the timer value to the value provided by searchSpaceSwitchingTimer-r16
- if the UE monitors PDCCH on a serving cell according to search space sets with group index 1, the UE starts monitoring PDCCH on the serving cell according to search space sets with group index 0, and stops monitoring PDCCH according to search space sets with group index 1, on the serving cell at the beginning of the first slot that is at least $P_{switch}$ symbols after a slot where the timer expires or after a last symbol of a remaining channel occupancy duration for the serving cell that is indicated by DCI format 2_0
If a UE is not provided SearchSpaceSwitchTrigger-r16 for a serving cell,
- if the UE detects a DCI format by monitoring PDCCH according to a search space set with group index 0, the UE starts monitoring PDCCH according to search space sets with group index 1, and stops monitoring PDCCH according to search space sets with group index 0, on the serving cell at a first slot that is at least $P_{switch}$ symbols after the last symbol of the PDCCH with the DCI format, the UE sets the timer value to the value provided by searchSpaceSwitchingTimer-r16 if the UE detects a DCI format by monitoring PDCCH in any search space set
- if the UE monitors PDCCH on a serving cell according to search space sets with group index 1, the UE starts monitoring PDCCH on the serving cell according to search space sets with group index 0, and stops monitoring PDCCH according to search space sets with group index 1, on the serving cell at the beginning of the first slot that is at least $P_{switch}$ symbols after a slot where the timer expires or, if the UE is provided a search space set to monitor PDCCH for detecting a DCI format 2_0, after a last symbol of a remaining channel occupancy duration for the serving cell that is indicated by DCI format 2_0

TABLE 13

SearchSpaceSwitchingDelay
Indicates the value to be applied by a UE for Search Space Set Group switching; corresponds to the P value in TS 38.213, clause 11.5.2

When "monitoringCapabilityConfig-r16" is configured to "r16monitoringcapability", the UE can perform PDCCH monitoring based on the maximum number of PDCCH candidates (see Table 10.1-2A of Table 9) for each span and the number of non-overlapping CCEs (see Table 10.1-3A of Table 9) for each span. Additionally, if "searchSpaceGroupIdList-r16" is set, the UE can perform switching between search space set groups. At this time, since the UE performs PDCCH monitoring corresponding to one specific search space set group at one time point, it is preferable for the UE to set the PDCCH monitoring pattern for each search space set group. Specifically, when the UE reports, to the base station (BS), the plurality of (X, Y) combinations as the ability related to PDCCH monitoring, the UE can determine a specific (X, Y) combination for each search space set group as in the above-described options 1 and 2, and can be determined as shown in Table 14. Here, the specific (X, Y) combination can be determined as shown in Table 14 below.

UE has to additionally perform changing of (X, Y), so that the UE may consume much more time corresponding to the P_switch value. For example, when the search space set groups have different (X, Y) combinations, the process for changing the (X, Y) combination when the UE switches the search space set group is also required, so that the UE may consume much more time as compared to the case in which the same (X, Y) combination is used in the respective search space set groups. That is, when the (X, Y) combinations determined for the respective search space set groups are different from each other, a higher P_switch value may be required than the case in which the same (X, Y) combinations are used. Therefore, when the (X, Y) combinations determined for the respective search space set groups are different from each other, the P_switch value can be determined as shown in the following options.

Option 2-1: A new P_switch value may be defined when the (X, Y) combinations determined for the respective

TABLE 14

If a UE indicates a capability to monitor PDCCH according to multiple (X, Y) combinations and a configuration of search space sets to the UE for PDCCH monitoring on a cell results to a separation of every two consecutive PDCCH monitoring spans that is equal to or larger than the value of X for one or more of the multiple combinations (X, Y), the UE monitors PDCCH on the cell according to the combination (X, Y), from the one or more combinations (X, Y), that is associated with the largest maximum number of $C_{PDCCH}^{max,(X,Y),\mu}$ and $M_{PDCCH}^{max,(X,Y),\mu}$ defined in Table 10.1-2A and 10.1-3A.

When the UE switches the search space set group, a delay as much as the P_switch value shown in Table 11 can be applied to such switching. If the search space set groups have different (X, Y) combinations as shown in Option 2, the search space set groups are different from each other. Specifically, another P_switch value may be defined differently from the P_switch value that is defined when the same (X, Y) combination is used in the respective search space set groups. The P_switch value obtained when the (X, Y) combinations determined for the respective search space set groups are different from each other may be greater than 25 symbols (indicating a value based on UE processing capability 1) defined in Table 10.4-1 of Table 11, and separate UE capability may be introduced to support the newly defined P_switch value. For example, in order for the UE to report the P_switch value obtained when the respective search space set groups have different (X, Y) combinations to the base station (BS), separate UE capability signaling can be introduced.

Option 2-2: the alpha (α) value may be added to a predetermined P_switch value when different (X, Y) combinations are applied to the respective search space set groups. For example, when different (X, Y) combinations are used in the respective search space set groups, a specific value obtained by adding the alpha (α) value to the P_switch value of Table 10.4-1 of Table 11 may be used. In this case, the P_switch value of Table 10.4-1 of Table 11 may be applied to the case in which the same (X, Y) combination is used for each search space set group. Here, the alpha (α) value may be pre-defined (e.g., alpha (α)=5 symbols), or may be determined differently according to the UE capability and/or the BS configuration.

Option 2-3: In a situation where different (X, Y) combinations are used in the respective groups, the UE can expect that the P_switch value is set to be equal to or higher than a specific threshold (e.g., 30 symbols).

Option 2-4: As a combination of Option 2-2 and Option 2-3, the actual switching time may be given as a specific value that is obtained when the alpha (α) value is added to the P_switch value configured in a situation where the P_switch value of more than a specific threshold is set. In this case, the actual switching time may refer to a delay value to be actually applied. For example, when the threshold value is set to 30 symbols and the alpha (α) value is set to 5 symbols, the actual switching time may be determined to be a value obtained when the 5 symbols are added to the P_switch value that is set to 30 symbols or more.

2) Transmitter (Entity B; Base Station):

[Method #1A]

For all search space sets (regardless of grouping for the search space set) (within the activated BWP), the search space sets scheduled to perform monitoring for each slot can be determined in a manner that constraints for the maximum number of PDCCH candidates and the maximum number of non-overlapping CCEs can be satisfied. In addition, if the specific group A is configured/indicated/recognized to monitor the PDCCH, it can be expected that the base station (BS) does not perform monitoring for a search space set that does not belong to the following search space sets (i.e., search space sets set configured not to belong to any group and search space sets configured to belong to Group A). That is, if the specific group A is configured/indicated/recognized to monitor the PDCCH, it can be expected that the BS will perform monitoring only for a search space set belonging to the search space sets.

Search spaces set(s) configured not to belong to any group
Search space set(s) configured to belong to Group A For example, 10 search space sets (i.e., search space sets #0~#9) can be set in the activated BWP, and two groups can be set as follows for all search space sets. At this time, search space set #0 from among the 10 search space sets may be a CSS set, and the remaining search space sets (search space sets #1~#9) may be UE-specific search space sets.

Group #0: Search Space Sets #2/4/6/8
Group #1: Search Space Sets #2/3/5/7/9

The UE may be configured to monitor all of the ten search space sets at a specific slot #n. According to Method #1, the rules shown in Table 7 can be used regardless of grouping for the search space sets. In this case, the rules shown in Table 7 can be sequentially determined in the order of ascending indexes (e.g., search space sets #0 to #9) of the search space sets to be monitored by the UE. Accordingly, PDCCH monitoring for the search space set #0 corresponding to the CSS set, and PDCCH monitoring for the search space sets #1, #2, #3, and #4 corresponding to UE-specific search space sets can be allowed. In this case, if PDCCH monitoring for Group #0 is configured/indicated/recognized, the UE may perform PDCCH monitoring for search space sets #0/1/2/4 in the slot #n, and may not perform PDCCH monitoring for the search space set #3 in the slot #n. In other words, if PDCCH monitoring for group #0 is configured/indicated/recognized in the UE, from among the search space sets #0/1/2/3/4 in which PDCCH monitoring is allowed, the UE may perform monitoring for the search space sets (#0, #1) not belonging to any group, and the search space sets (#2, #4) belonging to Group #0, and may not perform monitoring for the search space set #3 belonging to Group #1. Alternatively, if PDCCH monitoring for Group #1 is configured/indicated/recognized in the UE, the UE may perform PDCCH monitoring for the search space sets #0/1/2/3 in the slot #n, and may not perform PDCCH monitoring for the search space set #4 in the slot #n. That is, from among the search space sets #0/1/2/3/4 in which PDCCH monitoring is allowed, the UE may perform monitoring for the search space sets (#0, #1) not belonging to any group, and the search space sets (#2, #3) belonging to Group #0, and may not perform monitoring for the search space set #4 belonging to only Group #0. The base station (BS) may transmit the PDCCH according to the configuration of the UE. For example, in the above-described example, if it is expected that the UE will perform PDCCH monitoring for search space sets #0/1/2/3 at the slot #n without performing PDCCH monitoring for the search space set #4, the BS may transmit the PDCCH within resources/regions corresponding to search space sets #0/1/2/3 at the slot #n.

The above-described proposed method can also be applied to CSS sets for each specific slot of a specific cell. Specifically, the UE may not expect that the number of the CSS sets for each specific slot of a specific cell is set to exceed the constraint condition related to the maximum number of PDCCH candidates and the maximum number of non-overlapping CCEs. That is, for common search space sets for each specific slot of a specific cell, the UE may not expect a configuration that does not satisfy constraints about the maximum number of PDCCH candidates and the maximum number of non-overlapping CCEs. At this time, regardless of whether the CSS sets are configured to belong to a specific group, the UE may not expect a configuration that does not satisfy constraints on the maximum number of PDCCH candidates within a specific slot of a specific cell and the maximum number of non-overlapping CCEs. In other words, regardless of whether the CSS sets are configured to belong to a specific group, the BS may not expect a configuration that does not satisfy constraints on the maximum number of PDCCH candidates and the maximum number of non-overlapping CCEs within a specific slot of a specific cell. That is, the base station (BS) may be configured to satisfy constraints related to the maximum number of PDCCH candidates and the maximum number of non-overlapping CCEs within a specific slot of a specific cell.

Alternatively, the above-described proposed method can be applied to all search space sets for each specific slot of a specific secondary cell. Specifically, for all search space sets configured for each specific slot of a specific secondary cell, the UE may not expect that the number of search space sets is set to exceed constraints on the maximum number of PDCCH candidates and the maximum number of non-overlapping CCEs. In other words, the UE may not expect a configuration that does not satisfy constraints on the maximum number of PDCCH candidates and the maximum number of non-overlapping CCEs, for all search space sets for each specific slot of a specific secondary cell. At this time, regardless of whether the search space sets configured for each specific slot of a specific secondary cell are configured to belong to a specific group, the UE may not expect a configuration that does not satisfy the constraints on the maximum number of PDCCH candidates within a specific slot of a specific cell and the maximum number of non-overlapping CCEs. In other words, regardless of whether the corresponding search space sets are configured to belong to a specific group. The base station (BS) may not be configured to exceed the constraints on the maximum number of PDCCH candidates and the maximum number of non-overlapping CCEs within a specific slot of a specific cell.

[Method #2A]

For all search space sets configured (in the activated BWP) in consideration of grouping for a search space set, search space sets scheduled to perform monitoring for each slot may be determined to satisfy constraints on the maximum number of PDCCH candidates and the maximum number of non-overlapping CCEs as shown in Table 7. That is, a separate PDCCH monitoring pattern (or different PDCCH monitoring patterns) can be configured depending on whether PDCCH monitoring for a certain group at a specific slot is configured/indicated/recognized in the UE. In addition, if PDCCH monitoring for a specific group is configured/indicated/recognized in the UE, the BS can expect to activate the operation of the UE that performs PDCCH monitoring by selecting only one pattern from among the plurality of pre-configured patterns.

In other words, when PDCCH monitoring for a specific group at a specific slot is configured/indicated/recognized in the UE, some search space sets that are guaranteed not to be used from among all search space sets configured (in the activated BWP) can be excluded. In addition, as shown in Table 2, the search space sets scheduled to perform monitoring for each slot can be determined to satisfy constraints on the maximum number of PDCCH candidates and the maximum number of non-overlapping CCEs.

When 10 search space sets (search space sets #0 to #9) are configured in a specific BWP, the following two groups can be configured as one example of grouping for search space sets. In this case, the search space set #0 may be a CSS set, and the remaining search space sets may be UE-specific search space sets. In the case of the CSS set, there is a need for the UE to perform monitoring at all times. In the following example, it is assumed that the UE monitors all of the 10 search space sets at a specific slot #n.

Group #0: Search Space Sets #2/4/6/8
Group #1: Search Space Sets #2/3/5/7/9

As an example, as the PDCCH monitoring pattern #1 for the slot #n, the search space sets #1/2/4/6/8 (i.e., the search space sets not belonging to any group, the search space sets belonging to Group #0, and the remaining search space sets other than the search space sets belonging to only Group #1) can be defined. According to the result of applying the rules shown in Table 7 to the search space sets #1/2/4/6/8 belonging to the PDCCH monitoring pattern #1, PDCCH monitoring can be allowed not only for the search space set #0 corresponding to the CSS set, but also for search space sets #1/2/4 corresponding to UE-specific search space sets. Here, when the rules shown in Table 7 are applied in PDCCH monitoring pattern #1, the rules can be sequentially applied to the search space sets arranged in the order of ascending indexes. For example, the UE may determine whether conditions on the maximum number of PDCCH candidates and the number of non-overlapping CCEs are satisfied in the order of ascending indexes of the search space sets #1/2/4/6/8 belonging to the PDCCH monitoring pattern #1. In addition, as the PDCCH monitoring pattern #2 for the slot #n, the search space sets #1/2/3/5/7/9 (i.e., the search space sets not belonging to any group, the search space sets belonging to Group #1, and the remaining search space sets other than the search space sets belonging to only Group #0) can be defined. According to the result of applying the rules shown in Table 7 to the search space sets #1/2/3/5/7/9 belonging to the PDCCH monitoring pattern #2, PDCCH monitoring can be allowed not only for the search space set #0 corresponding to the CSS set, but also for search space sets #1/2/3/5 corresponding to UE-specific search space sets. In addition, when PDCCH monitoring for Group #0 in the slot #n is configured/indicated/recognized in the UE, the UE may perform PDCCH monitoring for search space sets (e.g., search space sets #0/1/2/4) satisfying the rules shown in Table 7 in the PDCCH monitoring pattern #1 within the slot #n. Alternatively, when PDCCH monitoring for Group #1 in the slot #n is configured/indicated/recognized in the UE, the UE may perform PDCCH monitoring for search space sets (e.g., search space sets #0/1/2/3/5) satisfying the rules shown in Table 7 in the PDCCH monitoring pattern #2 within the slot #n. At this time, the search space set #0 can always be monitored as a CSS set.

According to the UE configuration by the BS, the base station (BS) may transmit the PDCCH. For example, in the above-described example, if it is expected that the UE will perform PDCCH monitoring for the PDCCH monitoring pattern #2 (e.g., search space sets #0/1/2/3/5) at the slot #n, the BS can transmit the PDCCH within resources/regions corresponding to the PDCCH monitoring pattern #2 at the slot #n.

As another example, (UE-specific) search space sets can be divided into three types as follows, and the rules shown in Table 7 can be applied according to priorities defined/configured/indicated in advance for each type.

Type 1: Search space sets (for example, search space set #1) that do not belong to any group
Type 2: Search space sets (for example, search space set #2) belonging to all groups
Type 3: Other search space sets For example, if priority is defined/configured/indicated in the order of Type 1→Type 2→Type 3, the rules shown in Table 7 can be preferentially applied to search space sets belonging to Type 1 at a specific slot #n. Thereafter, when the rules shown in Table 7 are applied, values corresponding to the number of remaining PDCCH candidates and the number of non-overlapping CCEs can be applied to search space sets belonging to Type 2. Thereafter, when the rules shown in Table 7 are applied, a value corresponding to the number of remaining PDCCH candidates and the number of non-overlapping CCEs can be applied to search space sets belonging to Type 3. Applying the rules shown in Table 7 to three types (Type 1, Type 2, Type 3) can be used in the same manner as in the above-described Method #2.

In addition, the rules shown in Table 7 can be applied to each of the separately defined PDCCH monitoring patterns. For search space sets belonging to Type 3, when the rules shown in Table 7 are applied, two PDCCH monitoring patterns can be separately defined. That is, for search space sets belonging to Type 3, when the rules shown in Table 7 are applied, the rules shown in Table 7 can be applied for each PDCCH monitoring pattern. Specifically, according to the result of applying the rules shown in Table 7 to the search space sets #4/6/8 (i.e., search space sets belonging to only Group #0) as the PDCCH monitoring pattern #1, PDCCH monitoring for the search space set #4 can be allowed. That is, according to the result of applying the rules shown in Table 7 to the search space sets #4/6/8 (i.e., search space sets belonging to only Group #0) corresponding to Type 3 from among the search space sets #1/2/4/6/8 included in the PDCCH monitoring pattern #1, PDCCH monitoring for the search space set #4 can be allowed. At this time, the UE may determine whether the above rules are satisfied in the order of ascending indexes of the search space sets #4/6/8. If only the search space set #4 satisfies the above condition, the remaining search space sets #6/8 can be dropped. Therefore, the UE may perform PDCCH monitoring for the search space set #1 belonging to Type 1, the search space set #2 belonging to Type 2, and the search space set #4 satisfying the above rules from among the search space sets belonging to Type 3 in the PDCCH monitoring pattern #1. According to the result of applying the rules shown in Table 7 to the search space sets #3/5/7/9 (i.e., search space sets belonging to only Group #1) as the PDCCH monitoring pattern #2 for the slot #n, PDCCH monitoring for the search space sets #3/5 can be allowed. In other words, according to the result of applying the rules shown in Table 7 to the search space sets #3/5/7/9 belonging to Type 3 from among the search space sets #1/2/3/5/7/9 belonging to the PDCCH monitoring pattern #2, PDCCH monitoring for the search space sets #3/5 can be allowed. In association with the search space sets belonging to Type 3, the UE can determine whether the search space sets belonging to Type 3 satisfy the maximum number of remaining PDCCH candidates and the maximum number of remaining non-overlapping CCEs by subtracting the number of PDCCH candidates corresponding to Type 1 and Type 2 and the number of non-overlapping CCEs corresponding to Type 1 and Type 2 from the number of PDCCH candidates and the number of non-overlapping CCEs according to the rules shown in Table 7. The UE may determine whether the search space sets #3/5/7/9 sequentially satisfy the above condition in the order of ascending indexes of the search space sets #3/5/7/9. If only the search space sets #3/5 satisfy the above condition, the remaining search space sets #7/9 can be dropped. Therefore, the UE may perform PDCCH monitoring for the search space set #1 belonging to Type 1, the search space set #2 belonging to Type 2, and the search space sets #3/5 satisfying the above rules from among the search space sets belonging to Type 3 in the PDCCH monitoring pattern #2.

When PDCCH monitoring for Group #0 in the slot #n is configured/indicated/recognized in the UE, the UE can perform PDCCH monitoring for search space sets belonging to Type 1 and Type 2 in the slot #n, and at the same time can perform PDCCH monitoring for the PDCCH monitoring pattern #1 in the slot #n. Alternatively, when PDCCH monitoring for Group #1 is configured/indicated/recognized in the UE in the slot #n, the UE can perform PDCCH monitoring for the PDCCH monitoring pattern #2 as well as PDCCH monitoring for the search space sets belonging to Types 1 and 2 in the slot #n. Specifically, when the PDCCH monitoring for Group #0 is configured/indicated/recognized in the UE in the slot #n, the UE can apply the rules shown in Table 7 in the order of search space sets belonging to Type 1→search space sets belonging to Type 2→search space sets belonging to Type 3. Accordingly, the UE can perform PDCCH monitoring for search space sets belonging to Type 1 and Type 2, and can also perform PDCCH monitoring for search space sets satisfying the rules shown in Table 7 from among search space sets of the PDCCH monitoring pattern #1 belonging to Type 3. In addition, the UE can perform PDCCH monitoring for search space set #0 corresponding to a CSS set. In addition, when the PDCCH monitoring for Group #1 is configured/indicated/recognized in the UE in the slot #n, the UE can perform PDCCH monitoring for search space sets belonging to Type 1 and Type 2, and can also perform PDCCH monitoring for search space sets satisfying the rules show in Table 7 from among search space sets of PDCCH monitoring pattern #2 belonging to Type 3.

According to the UE configuration by the base station (BS), the BS may transmit the PDCCH. For example, in the above-described example, if it is expected that the UE will perform PDCCH monitoring not only for the search space sets belonging to Type 1 and Type 2 at the slot #n, but also for the PDCCH monitoring pattern #2 (e.g., search space sets #0/1/2/3/5) at the slot #n, the BS can transmit the PDCCH within resources/regions corresponding to the PDCCH monitoring pattern #2 as well as the search space sets belonging to Type 1 and Type 2 at the slot #n. That is, if the UE is expected to perform PDCCH monitoring not only for the search space sets (search space sets #1/2) belonging to Type 1 and Type 2, but also for the search space sets (search space sets #3/5) satisfying the rules shown in Table 7 from among search space sets of the PDCCH monitoring pattern #2 belonging to Type 3, the BS can transmit the PDCCH within resources/regions corresponding to the search space sets satisfying the rules shown in Table 7 from among the search space sets belonging to Type 1 and Type 2 and the search space sets of the PDCCH monitoring pattern #2 belonging to Type 3. In this case, the search space set #0 may refer to the common search space (CSS) set, and the UE can always perform PDCCH monitoring for the CSS set.

The above-described proposed method can also be applied to CSS sets for each specific slot of a specific cell. Specifically, the UE may not expect a configuration that does not satisfy constraints on the maximum number of PDCCH candidates and the maximum number of non-overlapping CCEs, for CSS sets for each specific slot of a particular cell. In this case, if the CSS sets are configured to belong to a specific group, in consideration of grouping as in the above-described proposed method, the UE may not expect a configuration that does not satisfy constraints on the maximum number of PDCCH candidates and the maximum number of non-overlapping CCEs within a specific slot of a specific cell. In other words, when the CSS sets are configured to belong to a specific group, in consideration of grouping, the base station (BS) may not be configured to exceed the constraints on the maximum number of PDCCH candidates and the maximum number of non-overlapping CCEs within a specific slot of a specific cell. That is, the base station (BS) may be configured to satisfy the constraints on the maximum number of PDCCH candidates and the maximum number of non-overlapping CCEs within the specific slot of the specific cell.

For example, it is assumed that, when search space sets #0/1/2/3 are common search space (CSS) sets, the CSS set #0 does not belong to any group, the CSS set #1 belongs to all groups #0/1, the CSS set #2 belongs to group #0, and the CSS set #3 belongs to group #1. In addition, it is assumed that at a specific slot #n, the UE is configured to monitor all of the above four search space sets. In association with the CSS sets #0/1/2 at a specific slot #n, the UE may not expect a configuration that does not satisfy constraints on the maximum number of PDCCH candidates and the maximum number of non-overlapping CCEs. At this time, the search space sets #0/1/2 may correspond to the PDCCH monitoring pattern #1. In association with the CSS sets #0/1/3 at a specific slot #n, the UE may not expect a configuration that does not satisfy constraints on the maximum number of PDCCH candidates and the maximum number of non-overlapping CCEs. At this time, the search space sets #0/1/3 may correspond to the PDCCH monitoring pattern #2.

Alternatively, the above-described proposed method can also be applied to search space sets for each specific slot of a specific secondary cell. Specifically, in association with all search space sets configured for each specific slot of a specific secondary cell, the UE may not expect a configuration that does not satisfy constraints on the maximum number of PDCCH candidates and the maximum number of non-overlapping CCEs. In this case, if the search space sets can be configured to belong to a specific group, in consideration of grouping of the search space sets as in the above-described proposal, the UE may not expect a configuration that does not satisfy constraints on the maximum number of PDCCH candidates and the maximum number of non-overlapping CCEs within a specific slot of a specific secondary cell. In other words, when the search space sets are configured to belong to a specific group, in consideration of grouping, the base station (BS) may not be configured to exceed constraints on the maximum number of PDCCH candidates and the maximum number of non-overlapping CCEs within a specific slot of a specific secondary cell.

For example, it is assumed that, when search space sets #0/1/2/3 are configured in a specific slot of a specific secondary cell, the search space set #0 does not belong to any group, the search space set #1 belongs to groups #0/1, the search space set #2 belongs to group #1, and the search space set #3 belongs to group #1. In addition, it is assumed that, at a specific slot #n, the UE is configured to monitor all of the above four search space sets. At this time, in association with the search space sets #0/1/2 at the specific slot #n, the UE may not expect a configuration that does not satisfy constraints on the maximum number of PDCCH candidates and the maximum number of non-overlapping CCEs. In addition, in association with the search space sets #0/1/3 at a specific slot #n, the UE may not expect a configuration that does not satisfy constraints on the maximum number of PDCCH candidates and the maximum number of non-overlapping CCEs.

Alternatively, in association with search space sets (to be monitored when monitoring for a specific group is configured/indicated) corresponding to a specific group (e.g., Group #1) configured for each specific slot from among the group #0 and the group #1 configured in a specific cell (e.g., a primary cell), the BS may not be configured to exceed constraints on the maximum number of PDCCH candidates and the maximum number of non-overlapping CCEs.

For example, it is assumed that the search space set #0 does not belong to any group, the search space set #1 belongs to groups #0/1, the search space set #2 belongs to group #0, and the search space set #3 belongs to group #1.

In addition, it is assumed that the UE is configured to monitor all of the four search space sets at a specific slot #n. When monitoring for Group #1 is configured/indicated/performed in a specific slot #n, the UE may perform PDCCH monitoring for search space sets #0/1/3 in the corresponding slot #n. At this time, for the search space sets #0/1/3 in the corresponding slot #n, the BS may not be configured to exceed constraints on the maximum number of PDCCH candidates and the maximum number of non-overlapping CCEs.

In the present disclosure, the operations for setting/instructing/recognizing PDCCH monitoring for a specific group by the UE may mean at least one of the following methods.

According to the discovery of a specific downlink (DL) signal/channel (e.g., a DM-RS (Demodulation Reference Signal) linked to a specific PDCCH and/or a CORESET, a UE-specific DCI, a group-common DCI, and a cell-specific DCI, PDCCH monitoring for a particular group can be instructed. For example, before a corresponding DL signal/channel is discovered, and after lapse of a specific time period after the discovery of the corresponding DL signal/channel, PDCCH monitoring corresponding to Group A (e.g., that is pre-defined/pre-configured as a specific group index (e.g., Group Index #0), or a group index corresponding to a shorter period from among a minimum period A of the search space sets belonging to Group #0 and a minimum period B of the search space sets belonging to Group #1) may be performed. Within a specific time period after the discovery of the corresponding DL signal/channel, PDCCH monitoring corresponding to Group B (e.g., that is pre-defined/pre-configured as a specific group index (e.g., Group Index #1), or a group index corresponding to a longer period from among a minimum period A of the search space sets belonging to Group #0 and a minimum period B of the search space sets belonging to Group #1) may be performed. At this time, the specific time period may be pre-defined, or may refer to a time period until the COT is ended in a situation where information (e.g., the length of the remaining COT) about the COT occupied by the base station (BS) is signaled. Alternatively, the specific time period may refer to a time period until the COT is ended (e.g., the last slot instructed by SFI information) when COT-related information is signaled through DCI carrying SFI information.

PDCCH monitoring for a specific group can be instructed according to the base station COT information included in a specific DL channel (e.g., UE-specific DCI, group-common DCI, and cell-specific DCI). For example, if it is possible to indicate whether the UE is located inside or outside the COT range of the base station (BS) in the corresponding DL channel, PDCCH monitoring corresponding to Group A (e.g., that is pre-defined/pre-configured as a specific group index (e.g., Group Index #0), or a group index corresponding to a shorter period from among a minimum period A of the search space sets belonging to Group #0 and a minimum period B of the search space sets belonging to Group #1) can be performed within the COT. In addition, when the UE is located outside the COT range, PDCCH monitoring corresponding to Group B (e.g., that is pre-defined/pre-configured as a specific group index (e.g., Group Index #1), or a group index corresponding to a longer period from among a minimum period A of the search space sets belonging to Group #0 and a minimum period B of the search space sets belonging to Group #1) can be performed. According to the present disclosure, the reason why PDCCH monitoring is less frequently performed within the COT range and PDCCH monitoring is more frequently performed at a position located outside the COT range are considered preferable is as follows. From the viewpoint of the base station (BS), the BS can receive an opportunity capable of more frequently acquiring a channel prior to channel occupation. From the viewpoint of the UE, the UE performs PDCCH monitoring less frequently after the base station (BS) has occupied the channel, such that power consumption of the UE can be reduced.

Information about which group will be used for PDCCH monitoring in a specific DL signal/channel (e.g., DM-RS linked to a specific PDCCH and/or CORESET, UE-specific DCI, group-common DCI, and cell-specific DCI) can be directly instructed. For example, when Group A is instructed in the corresponding DL channel, the UE may perform PDCCH monitoring corresponding to Group A (within the COT). When Group B is instructed, the UE may perform PDCCH monitoring corresponding to Group B. When the corresponding DL channel is a group-common DCI (for example, DCI format 2_0) capable of carrying channel occupancy (CO) or COT information of the base station (BS), the UE may perform PDCCH monitoring corresponding to Group A within the COT. In addition, although the UE does not receive the DCI indicating Group B, the UE may perform PDCCH monitoring corresponding to Group B at a position outside the COT. For example, Group B may be pre-defined/pre-configured as a specific group index (e.g., Group Index #0), or may be a group index corresponding to a shorter period from among a minimum period A of the search space sets belonging to Group #0 and a minimum period B of the search space sets belonging to Group #1. Alternatively, in a situation where the corresponding DL channel is a UE-specific DCI, when the corresponding DCI indicates Group A, the UE may perform PDCCH monitoring corresponding to Group A within a specific time period (e.g., within the maximum COT value of the BS or during the pre-defined/pre-configured timer expiration) from the DCI discovery. Thereafter, even when the UE does not receive the DCI indicating Group B, the UE may perform PDCCH monitoring corresponding to Group B after lapse of a predetermined time period from the DCI discovery. In this case, Group B may be pre-defined/pre-configured as a specific group index (e.g., Group Index #0), or may be a group index corresponding to a shorter period from among a minimum period A of the search space sets belonging to Group #0 and a minimum period B of the search space sets belonging to Group #1.

One or more specific time periods may be pre-configured, and the group of search space sets to be monitored within each of the pre-configured time periods may be pre-defined/pre-configured. For example, when a specific time period X is configured, the UE may perform PDCCH monitoring corresponding to Group A during the time period X, and may perform PDCCH monitoring corresponding to Group B during the remaining time periods other than the time period X. Alternatively, when a specific time period X and a time period Y are configured, the UE may perform PDCCH monitoring corresponding to Group A during the time period X, and may perform PDCCH monitoring corresponding to Group B during the time period Y. In this case, the time period X may refer to an ON duration of a discontinuous reception (DRX) cycle, or may refer to an active time introduced for the purpose of power saving. Alternatively, when the BS or UE applies a frame based equipment (FBE) operation based on ETSI BRAN regulation, the time period X may be the first K symbols of each FFP (fixed frame period) or may be a time period that is predefined/preconfigured of each FFP.

If one or more CSS (Common Search Space) sets (e.g., type3-PDCCH search space sets) corresponding to the group-common DCI (e.g., DCI format 2_0) capable of carrying CO or COT information of the BS are configured, and if the respective CSS sets are configured to belong to different search space set groups, SFI information corresponding to each group may be configured separately (or differently). The reason why the SFI information corresponding to each group is configured separately (or differently) is as follows. Under the condition that the number of slots indicated by SFI information is equal to or higher than the number of monitoring occasions (MOs) of the CSS set, if the monitoring occasion (MO) periods of the CSS sets of the respective groups are configured differently from each other, a minimum number of slots to be indicated by SFI information may be changed for each group. As an example, when the MO period of the CSS set belonging to Group A is composed of 4 slots, and when the MO period of the CSS set belonging to Group B is composed of only one slot, minimal information of SFI information provided through the group-common DCI corresponding to Group A may be 4 slots, and minimal information of SFI information provided through the group-common DCI corresponding to Group B may be 1 slot. In other words, the base station (BS) may configure separate RRC signaling for each group to satisfy the corresponding minimum information condition, and SFI information for more than a time period corresponding to the maximum value (e.g., four slots in the above example) from among the conditions of the minimum information for each group can be RRC-signaled for group-common DCI corresponding to all groups.

[Method #3A]

The UE may report, to the base station (BS), the capability related to PRCCH monitoring for each span (defined in Table 8), and a plurality of search space set groups may be configured. When the UE reports a plurality of (X, Y) combinations using the PDCCH monitoring-related capability, a specific combination (X, Y) can be determined by the following rules (Option 1 or Option 2).

Option 1: (X, Y) combination can be determined for each search space set group, and the base station (BS) can configure the search space sets such that (X, Y) combinations calculated for the respective group are the same.

Option 2: If (X, Y) combination is determined for each search space set group, and if (X, Y) combinations calculated for the respective groups are different from each other, the P switch value of Table 10.4-1 can be additionally required for the UE. For example, if (X, Y) combinations calculated for the respective groups are different from each other, a value greater than a predetermined P_switch value may be required according to Table 10.4-1 of Table 9. Referring to Table 13, "searchSpaceSwitchingDelay-r16" may indicate a P_switch value serving as a delay value that is applied to the UE switching the search space set group, and this P_switch value may be denoted by the number of symbols. In this case, the BS can expect that, a new P_switch value is to be defined when the respective groups have different (X, Y) combinations, an alpha (α) value is to be added to the existing P_switch value when the respective groups have different (X, Y) combinations, or a P_switch value equal to or greater than a specific threshold is to be set when the respective groups have different (X, Y) combinations.

As described in Tables 8 to 10 below, the combination (X, Y) may mean that PDCCH monitoring occasion (MO) is set in a situation where a gap of at least X symbols is present between two spans within one slot and each span includes a maximum of Y symbols. In this case, the span may refer to a time domain consisting of consecutive symbols configured to monitor the PDCCH within a specific slot.

When "monitoringCapabilityConfig-r16" is set to "r16monitoringcapability", the UE can perform PDCCH monitoring based on the maximum number of PDCCH candidates (see Table 10.1-2A of Table 9) for each span and the number of non-overlapping CCEs (see Table 10.1-3A of Table 9) for each span. Additionally, if "searchSpaceGroupIdList-r16" is set, the UE can perform switching between search space set groups. At this time, since the UE performs PDCCH monitoring corresponding to one specific search space set group at one time point, it is preferable for the UE to set the PDCCH monitoring pattern for each search space set group. Specifically, when the UE reports, to the base station (BS), the plurality of (X, Y) combinations as the ability related to PDCCH monitoring, the UE can determine a specific (X, Y) combination for each search space set group as in the above-described options 1 and 2, and can be determined as shown in Table 14. Here, the specific (X, Y) combination can be determined as shown in Table 14 below.

When the UE switches the search space set group, a delay as much as the P_switch value shown in Table 11 can be applied to such switching. If the search space set groups have different (X, Y) combinations as shown in Option 2, the UE has to additionally perform changing of (X, Y), so that the UE may consume more time as much as the P_switch value than before. For example, when the search space set groups have different (X, Y) combinations, the process for changing the (X, Y) combination when the UE switches the search space set group is also required, so that the UE may consume much more time as compared to the case in which the same (X, Y) combination is used in the respective search space set groups. That is, when the (X, Y) combinations determined for the respective search space set groups are different from each other, a higher P_switch value may be required than the case in which the same (X, Y) combinations are used. Therefore, when the (X, Y) combinations determined for the respective search space set groups are different from each other, the P_switch value can be determined as shown in the following options.

Option 2-1: A new P_switch value may be defined when the (X, Y) combinations determined for the respective search space set groups are different from each other. Specifically, another P_switch value may be defined differently from the P_switch value that is defined when the same (X, Y) combination is used in the respective search space set groups. The P switch value obtained when the (X, Y) combinations determined for the respective search space set groups are different from each other may be greater than 25 symbols (indicating a value based on UE processing capability 1) defined in Table 10.4-1 of Table 11, and separate UE capability may be introduced to support the newly defined P_switch value. For example, in order for the UE to report the P_switch value obtained when the respective search space set groups have different (X, Y) combinations to the base station (BS), separate UE capability signaling can be introduced.

Option 2-2: the alpha (α) value may be added to a predetermined P_switch value when different (X, Y) combinations are applied to the respective search space set groups. For example, when different (X, Y) combinations are used in the respective search space set groups, a specific value obtained by adding the alpha (α) value to the P_switch value of Table 10.4-1 of Table 11 may be used. In this case, the P_switch value of Table 10.4-1 of Table 11 may be applied to the case in which the same (X, Y) combination is used for each search space set group. Here, the alpha (α) value may be pre-defined (e.g., alpha (α)=5 symbols), or may be determined differently according to the UE capability and/or the BS configuration.

Option 2-3: In a situation where different (X, Y) combinations are used in the respective groups, the UE can expect that the P_switch value is set to be equal to or higher than a specific threshold (e.g., 30 symbols).

Option 2-4: As a combination of Option 2-2 and Option 2-3, the actual switching time may be given as a specific value that is obtained when the alpha (α) value is added to the P_switch value configured in a situation where the P_switch value of more than a specific threshold is set. In this case, the actual switching time may refer to a delay value to be actually applied. For example, when the threshold value is set to 30 symbols and the alpha (α) value is set to 5 symbols, the actual switching time may be determined to be a value obtained when the 5 symbols are added to the P_switch value that is set to 30 symbols or more.

Receiver & Transmitter (Between Receiver and Transmitter)

According to various embodiments, as shown in FIG. 7, the base station (BS) may allocate, to the UE, a BWP and a plurality of search space sets to be monitored in each BWP. In addition, the BS may additionally configure the group index so that the BS can recognize information about which group will be used to include each search space set. When the BS informs the UE of information about which group is valid or activated in a specific slot, the UE can monitor PDCCHs included in each search space set corresponding to the valid or activated group based on information received from the BS.

FIGS. 8 and 9 are flowcharts illustrating operations of the UE and the BS according to an embodiment.

Referring to FIG. 8, the UE can obtain information about a plurality of search space sets and a plurality of groups including parts of the plurality of search space sets (S800). In this case, each of the plurality of search space sets may be included in the plurality of groups, may be included in only one of the plurality of groups, or may not be included in the plurality of groups. Information about the plurality of groups may be obtained from the base station (BS) through higher layer signaling (e.g., RRC signaling).

In addition, the UE can obtain information about one group for monitoring the PDCCH among the plurality of groups (S810). At this time, information about only one group may be configured/indicated based on signals (e.g., DCI) received from the BS, or the UE may recognize the information by itself. For example, a group index for indicating each of the plurality of groups may be configured, and information on one group may be information on a group index corresponding to the one group, but is not limited thereto.

Upon obtaining information on one group for monitoring the PDCCH, the UE may perform PDCCH monitoring on a search space set that satisfies a preconfigured condition among the search space sets corresponding to the one group (S820). A search space set corresponding to each group can be preconfigured as one monitoring pattern, and the UE can perform PDCCH monitoring for search space sets that satisfy a preconfigured condition within a monitoring pattern corresponding to the configured/indicated/recognized one group. For example, when two groups (Groups #0 and #1) are configured for a plurality of search space sets, a search space set corresponding to Group #0 can be configured as a monitoring pattern #1 and a search space set corresponding to Group #1 can be configured as a monitoring pattern #2, but is not limited thereto. In this case, the monitoring pattern #1 may include a search space set not included in the plurality of groups, a search space set included in Group #0, and the remaining search space sets other than search space sets included only in other groups (e.g., Group #1) other than Group #0 among the plurality of groups. The UE may perform PDCCH monitoring for a search space set that satisfies a preconfigured condition among the search space sets corresponding to only one configured/indicated/recognized group. In this case, the preconfigured condition may include a condition in which the number of PDCCH candidates and the number of non-overlapping CCEs are less than or equal to a specific value. In this case, a search space set that does not satisfy the preconfigured condition from among the search space sets corresponding to the one configured/indicated/recognized group may be dropped or deactivated. At this time, the UE may determine whether the preconfigured condition is satisfied in the order of indexes of the search space sets corresponding to the one configured/indicated/recognized group. For example, the UE may determine whether the preset condition is satisfied in the order of indexes of the search space sets. Other search space sets having the same or greater indexes than those of the search space sets not satisfying the preconfigured condition may be dropped or deactivated.

In addition, referring to FIG. 9, the base station (BS) may transmit, to the UE, information on a plurality of search space sets and a plurality of groups including a part of the plurality of search space sets (S900). For example, information on the plurality of groups may be transmitted through higher layer signaling (e.g., RRC signaling). In addition, the base station (BS) may transmit, to the UE, information on one group for transmitting the PDCCH from among the plurality of configured groups (S910). In this case, information on the one group can be transmitted to the UE through DCI signaling, but is not limited thereto. When information on one group is transmitted to the UE, the UE can perform PDCCH monitoring based on a search space set corresponding to one group. The BS may transmit a PDCCH based on a resource of a search space set satisfying a preset condition from among search space sets corresponding to the one group (S920). In this case, the preset condition may include a condition in which the number of PDCCH candidates and the number of non-overlapping CCEs are less than or equal to a specific value.

DRX (Discontinuous Reception) Operation

The UE may perform the DRX operation while performing the procedures and/or methods described/proposed above. A UE for which DRX is configured may discontinuously receive a DL signal. Thereby, power consumption may be reduced. The DRX may be performed in a radio resource control (RRC)_IDLE state, an RRC_INACTIVE state, or the RRC_CONNECTED state. In the RRC_IDLE state and the RRC_INACTIVE state, the DRX is used to receive paging signals discontinuously. Hereinafter, DRX performed in the RRC_CONNECTED state (RRC_CONNECTED DRX) will be described.

FIG. 10 is a diagram schematically illustrating a DRX cycle (RRC_CONNECTED state). Referring to FIG. 10, a DRX cycle consists of an on duration and an opportunity for DRX. The DRX cycle defines a time period at which the on duration is periodically repeated. The on duration represents a time period during which the UE performs monitoring to receive the PDCCH. When DRX is configured, the UE performs PDCCH monitoring for the on duration. If there is a PDCCH successfully detected during PDCCH monitoring, the UE operates an inactivity timer and maintains the awake state. On the other hand, if there is no PDCCH successfully detected during PDCCH monitoring, the UE enters a sleep mode when the on duration ends. Accordingly, when DRX is configured, PDCCH monitoring/reception may be discontinuously performed in the time domain in performing the procedures and/or methods described/proposed above. For example, according to the present disclosure, when DRX is configured, a PDCCH reception occasion (e.g., a slot having a PDCCH search space) may be configured discontinuously according to the DRX configuration. On the other hand, when DRX is not configured, PDCCH monitoring/reception may be continuously performed in the time domain in performing the above-described/proposed procedures and/or methods. For example, according to the present disclosure, when DRX is not configured, a PDCCH reception occasion (e.g., a slot having a PDCCH search space) may be continuously configured. Regardless of whether DRX is configured, PDCCH monitoring may be restricted in a time duration configured as a measurement gap.

Table 15 shows a UE procedure related to the DRX (RRC_CONNECTED state). Referring to Table 15, DRX configuration information is received through higher layer (e.g., RRC) signaling, and whether the DRX is ON/OFF is controlled by a DRX command of the MAC layer. When DRX is configured, the UE may perform PDCCH monitoring discontinuously in performing the procedures and/or methods described/proposed in the present disclosure, as illustrated in FIG. 10.

TABLE 15

|  | Type of signals | UE procedure |
|---|---|---|
| $1^{st}$ step | RRC signalling (MAC-CellGroupConfig) | Receive DRX configuration information |
| $2^{nd}$ step | MAC CE ((Long) DRX command MAC CE) | Receive DRX command |
| $3^{rd}$ step | — | Monitor a PDCCH during an on-duration of a DRX cycle |

Here, MAC-CellGroupConfig includes configuration information required to configure a medium access control (MAC) parameter for a cell group. MAC-CellGroupConfig may also include configuration information about DRX. For example, MAC-CellGroupConfig may include the following information for defining DRX: —Value of drx-OnDurationTimer: Defines the length of a start section of the DRX cycle;

Value of drx-InactivityTimer: Defines the length of the time duration for which the UE remains awake after the PDCCH occasion in which the PDCCH indicating initial UL or DL data is detected;

Value of drx-HARQ-RTT-TimerDL: Defines the length of the maximum time duration from reception of initial DL transmission to reception of DL retransmission;

Value of drx-HARQ-RTT-TimerDL: Defines the length of the maximum time duration from reception of a grant for the initial UL transmission to a grant for UL retransmission;

drx-LongCycleStartOffset: Defines the time length and start point of the DRX cycle; and drx-ShortCycle (optional): Defines the time length of a short DRX cycle.

Here, if any one of drx-OnDurationTimer, drx-InactivityTimer, drx-HARQ-RTT-TimerDL, and drx-HARQ-RTT-TimerDL is in operation, the UE performs PDCCH monitoring at every PDCCH occasion while maintaining the awake state.

FIG. 11 illustrates a communication system 1 applied to the present disclosure.

Various descriptions, functions, procedures, proposals, methods, and/or operational flowcharts of the present disclosure disclosed in this document can be applied to various fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Referring to FIG. 11, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/ network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

FIG. 12 illustrates wireless devices applicable to the present disclosure.

Referring to FIG. 12, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 11.

Here, wireless communication technologies implemented in the wireless devices (100, 200) of the present specification may include LTE, NR, and 6G, as well as Narrowband Internet of Things (NB-IoT) for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (100, 200) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (100, 200) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/ low-power digital communication based on various standards such as IEEE 802.15.4, and may be called various names.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

In the present disclosure, at least one memory (e.g., 104 or 204) may store instructions or programs which, when executed, cause at least one processor operably coupled to the at least one memory to perform operations according to some embodiments or implementations of the present disclosure.

In the present disclosure, a computer-readable storage medium may store at least one instruction or computer program which, when executed by at least one processor, causes the at least one processor to perform operations according to some embodiments or implementations of the present disclosure.

In the present disclosure, a processing device or apparatus may include at least one processor and at least one computer memory coupled to the at least one processor. The at least one computer memory may store instructions or programs which, when executed, cause the at least one processor operably coupled to the at least one memory to perform operations according to some embodiments or implementations of the present disclosure.

FIG. 13 illustrates another example of a wireless device applied to the present disclosure. The wireless device may be implemented in various forms according to a use-case/service (refer to FIG. 11).

Referring to FIG. 13, wireless devices 100 and 200 may correspond to the wireless devices 100 and 200 of FIG. 12 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 12. For example, the transceiver(s) 114 may include the one or more transceivers 106 and 206 and/or the one or more antennas 108 and 208 of FIG. 12. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 11), the vehicles (100b-1 and 100b-2 of FIG. 11), the XR device (100c of FIG. 11), the hand-held device (100d of FIG. 11), the home appliance (100e of FIG. 11), the IoT device (100f of FIG. 11), a digital broadcast terminal, a hologram device, a public safety device, an MTC device, a medicine device, a fintech device (or a finance device), a security device, a climate/environment device, the AI server/device (400 of FIG. 11), the BSs (200 of FIG. 11), a network node, etc. The wireless device may be used in a mobile or fixed place according to a use-example/service.

In FIG. 13, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

FIG. 26 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 26, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 13, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to user equipments, base stations, or other devices in a wireless mobile communication system.

What is claimed is:

1. A method by a user equipment (UE), the method comprising:
    obtaining information regarding a plurality of search space sets and a plurality of groups, wherein each of the plurality of groups includes at least one of the plurality of search space sets;
    obtaining information regarding one group among the plurality of groups; and
    performing physical downlink control channel (PDCCH) monitoring based on a search space set satisfying a predetermined condition among search space sets corresponding to the one group,
    wherein the predetermined condition includes a condition in which a number of PDCCH candidates and a number of non-overlapping control channel elements (CCEs) are less than or equal to a maximum number of PDCCH candidates and a maximum number of non-overlapping CCEs,
    wherein the plurality of search space sets is classified into a plurality of types based on whether each of the plurality of search space sets is included in at least one of the plurality of groups, and
    wherein priority for applying the predetermined condition is determined based on the plurality of types.

2. The method according to claim 1,
    wherein the plurality of search space sets is a plurality of search space sets configured in a specific slot of a secondary cell or a plurality of common search space (CSS) sets configured in a specific slot of a primary cell.

3. The method according to claim 1,
wherein the plurality of types includes a first type, a second type, and a third type, and
wherein a search space set that is not included in all of the plurality of groups is included in the first type, a search space set that is included in all of two or more groups is included in the second type, and a search space set that does not correspond to the first type and the second type is included in the third type.

4. The method according to claim 1, further comprising:
determining whether the search space sets corresponding to the one group satisfy the predetermined condition in an order of indexes of the search space sets corresponding to the one group.

5. The method according to claim 1,
wherein the information regarding the one group includes information regarding a group index corresponding to the one group.

6. The method according to claim 1,
wherein the search space sets corresponding to the one group are pre-configured by a monitoring pattern, and
wherein the monitoring pattern includes a search space set not included in all of the plurality of groups, a search space set included in the one group, and search space sets other than search space sets included only in other groups excluding the one group among the plurality of groups.

7. The method according to claim 1, further comprising:
receiving a downlink signal including information regarding another group,
wherein the one group for the PDCCH monitoring is changed based on a time point when the downlink signal is received, and
wherein the PDCCH monitoring is performed based on a search space set satisfying the predetermined condition among search space sets corresponding to the one group that is changed.

8. The method according to claim 7,
wherein the one group for the PDCCH monitoring is changed before the downlink signal is received or after a predetermined time has elapsed from the time point when the downlink signal is received.

9. The method according to claim 1, further comprising:
transmitting, to a base station, capability information related to the PDCCH monitoring.

10. The method according to claim 9,
wherein, based on the capability information being different for a first group and a second group among the plurality of groups, a delay value to be applied when the one group for the PDCCH monitoring is changed between the first and second groups is larger than delay values respectively predetermined for the first and second groups.

11. A method by a base station (BS), the method comprising:
transmitting information regarding a plurality of search space sets and a plurality of groups, wherein each of the plurality of groups includes at least one of the plurality of search space sets;
transmitting information regarding one group among the plurality of groups; and
performing a physical downlink control channel (PDCCH) transmission based on a search space set satisfying a predetermined condition among search space sets corresponding to the one group,
wherein the predetermined condition includes a condition in which a number of PDCCH candidates and a number of non-overlapping control channel elements (CCEs) are less than or equal to a maximum number of PDCCH candidates and a maximum number of non-overlapping CCEs,
wherein the plurality of search space sets is classified into a plurality of types based on whether each of the plurality of search space sets is included in at least one of the plurality of groups, and
wherein priority for applying the predetermined condition is determined based on the plurality of types.

12. A method by a user equipment (UE), the method comprising:
transmitting capability information related to physical downlink control channel (PDCCH) monitoring;
obtaining information regarding a plurality of search space sets and a plurality of groups, wherein each of the plurality of groups includes at least one of the plurality of search space sets;
performing the PDCCH monitoring based on a search space set satisfying a predetermined condition among search space sets corresponding to a first group among the plurality of groups;
receiving a downlink signal including information regarding a second group among the plurality of groups;
switching a search space set group (SSSG) for the PDCCH monitoring from the first group to the second group based on the downlink signal,
wherein the SSSG for the PDCCH monitoring is switched at least a delay value after the downlink signal is received, and wherein, based on the capability information being different for the first group and the second group among the plurality of groups, the delay value is larger than delay values respectively predetermined for the first and second groups.

13. The method according to claim 12,
wherein the plurality of search space sets is classified into a plurality of types based on whether each of the plurality of search space sets is included in at least one of the plurality of groups, and
wherein priority for applying the predetermined condition is determined based on the plurality of types.

14. The method according to claim 13,
wherein the plurality of types includes a first type, a second type, and a third type, and
wherein a search space set that is not included in all of the plurality of groups is included in the first type, a search space set that is included in all of two or more groups is included in the second type, and a search space set that does not correspond to the first type and the second type is included in the third type.

15. The method according to claim 12,
wherein the search space set corresponding to the first group is pre-configured by a monitoring pattern, and
wherein the monitoring pattern includes a search space set not included in all of the plurality of groups, a search space set included in the first group, and search space sets other than search space sets included only in other groups excluding the first group among the plurality of groups.

* * * * *